United States Patent
Brunel et al.

(10) Patent No.: US 9,900,129 B2
(45) Date of Patent: Feb. 20, 2018

(54) METHOD AND DEVICE FOR DETERMINING TIME AND FREQUENCY RESOURCES FROM AMONGST TIME AND FREQUENCY RESOURCES OF WIRELESS COMMUNICATIONS NETWORK

(71) Applicant: MITSUBISHI ELECTRIC CORPORATION, Tokyo (JP)

(72) Inventors: Loic Brunel, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/111,852

(22) PCT Filed: Feb. 26, 2015

(86) PCT No.: PCT/JP2015/056442
§ 371 (c)(1),
(2) Date: Jul. 15, 2016

(87) PCT Pub. No.: WO2015/133556
PCT Pub. Date: Sep. 11, 2015

(65) Prior Publication Data
US 2016/0344518 A1 Nov. 24, 2016

(30) Foreign Application Priority Data
Mar. 6, 2014 (EP) .................................. 14158074

(51) Int. Cl.
*H04W 4/00* (2009.01)
*H04L 5/00* (2006.01)
(Continued)

(52) U.S. Cl.
CPC .............. *H04L 5/0005* (2013.01); *H04L 1/18* (2013.01); *H04L 5/0053* (2013.01);
(Continued)

(58) Field of Classification Search
None
See application file for complete search history.

(56) References Cited

U.S. PATENT DOCUMENTS

| 3,898,390 A | 8/1975 | Wells et al. |
| 8,265,126 B2 | 9/2012 | Sanji et al. |

(Continued)

FOREIGN PATENT DOCUMENTS

| EP | 1 137 299 A2 | 9/2001 |
| GB | 2 406 479 A | 3/2005 |

(Continued)

OTHER PUBLICATIONS

Preliminary Notice of Reasons for Rejection dated Jun. 6, 2017 issued in counterpart JP Application No. 2016-558897 with an English Translation.

*Primary Examiner* — Jutai Kao
(74) *Attorney, Agent, or Firm* — Birch, Stewart, Kolasch & Birch, LLP

(57) ABSTRACT

Considering individual sequences $T_1, \ldots, T_K$ over N successive frames for performing K individual transmissions, one time and frequency resource is allocated to each individual transmission per frame. The time and frequency resources can be represented by a grid with time resources on one dimension and frequency resources on another dimension. A managing device: computes a figure of merit $G(A, T_1, \ldots, T_K)$ for each possible set of the individual sequences $T_1, \ldots, T_K$ over the N successive frames on which respective frequency hopping sequences $[A_1, \ldots, A_N]=A$ apply, the figure of merit $G(A, T_1, \ldots, T_K)$ being representative of transmission robustness to interference and/or noise and/or path loss, and being determined under a constraint such that the frequency hopping sequences $A_1, \ldots, A_N$ are defined among a predefined set of allowable frequency hopping sequences which is a subset of all the (Continued)

Figure 1:
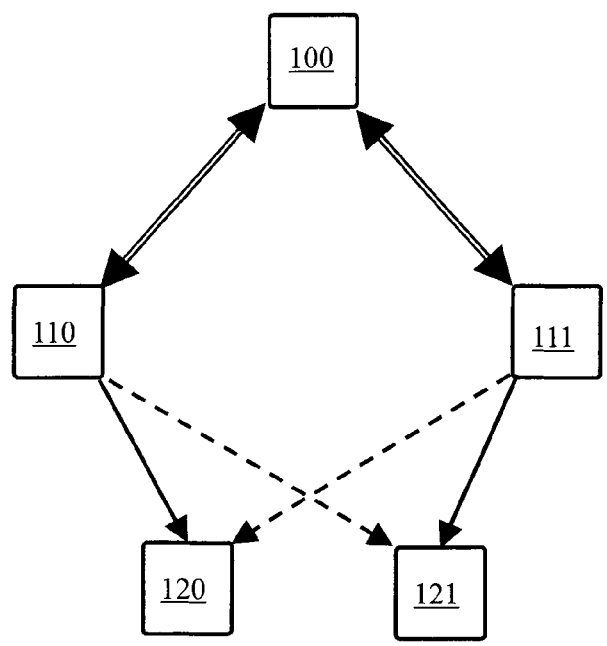

time and frequency resources sequences made possible by said grid; and selects the set of individual sequences $T_1, \ldots, T_K$ showing the best figure of merit $G(A, T_1, \ldots, T_K)$.

12 Claims, 8 Drawing Sheets

(51) Int. Cl.
  *H04W 16/14* (2009.01)
  *H04L 1/18* (2006.01)
  *H04W 72/02* (2009.01)
  *H04W 72/04* (2009.01)
(52) U.S. Cl.
  CPC .......... *H04W 16/14* (2013.01); *H04W 72/02* (2013.01); *H04W 72/042* (2013.01)

(56) References Cited

U.S. PATENT DOCUMENTS

| | | | |
|---|---|---|---|
| 2011/0103428 A1* | 5/2011 | Chan | H04W 16/14 375/133 |
| 2012/0014298 A1 | 1/2012 | Wachi et al. | |
| 2012/0155511 A1* | 6/2012 | Shaffer | H04B 1/7143 375/133 |

FOREIGN PATENT DOCUMENTS

| | | |
|---|---|---|
| JP | 2005-33418 A | 2/2005 |
| WO | WO 2007/059448 A1 | 5/2007 |
| WO | WO 2009/088681 A1 | 7/2009 |
| WO | WO 2009/120126 A1 | 10/2009 |
| WO | WO 2013/190258 A1 | 12/2013 |

* cited by examiner

METHOD AND DEVICE FOR DETERMINING TIME AND FREQUENCY RESOURCES FROM AMONGST TIME AND FREQUENCY RESOURCES OF WIRELESS COMMUNICATIONS NETWORK

The present invention generally relates to allocating time and frequency resources within a wireless communications network in order to perform individual transmissions over N successive frames, wherein the time and frequency resources of the wireless communications network can be represented thanks to a grid with time resources on one dimension and frequency resources on another dimension, the grid defining possible time and frequency resources sequences such that one transmission among the K individual transmissions being allowed per time resource, allocating the time and frequency resources being performed under a constraint such that frequency hopping sequences to be applied onto the N successive frames are defined among a predefined set of allowable frequency hopping sequences which is a subset of all the time and frequency resources sequences made possible by said grid.

In order to perform transmissions within a wireless communications network, resources of the wireless communications network need to be allocated by a device of the wireless communications network in charge of coordinating the resources usage.

Time and frequency resources are typically used to enable performing said transmissions. Time is divided into time slots of equal size, which thus defines time resources. Plural frequencies or frequency bands are available to perform transmissions, which thus define frequency resources. Usage of one such frequency or frequency band during one such time slot defines one time and frequency resource. Time and frequency resources are typically represented using a grid, with frequency resources represented on one axis and time resources represented on another axis.

Time and frequency resources allocation shall generally be signalled within the wireless communications network in order, for each device of the wireless communications network, to be able to determine via which time and frequency resources the transmissions are expected to effectively occur. Under many circumstances, a mechanism in charge of signalling has limited capacities, mostly related to the fact that signalling is indicated in a frame field having a limited size that does allow representing any time and frequency resources sequence from amongst all time and frequency resources sequences made possible by the aforementioned grid. For instance, considering a grid of twenty time resources and sixteen frequency resources, and further considering that one transmission occurs per time resource, eighty bits are required to be able to represent any time and frequency resources sequence from amongst all time and frequency resources sequences made possible by the grid (four bits per time resource to represent any frequency resource from amongst all possible frequency resources). When the frame field dedicated to signalling has a size strictly lower than the required eighty bits, only a subset of the time and frequency resources sequences made possible by the grid can therefore be signalled.

Moreover, in some wireless communications networks, frequency hopping sequences on a per frame basis are fixed and therefore not signalled. It however provides the same constraints as explained in the previous paragraph.

It is therefore desirable to provide a solution that allows improving robustness to interference and/or noise and/or path loss of said transmissions under such circumstances.

To that end, the present invention concerns a method for determining time and frequency resources from amongst time and frequency resources of a wireless communications network to be used for performing K individual transmissions over N successive frames in said wireless communications network, the time and frequency resources to be used for performing the K individual transmissions defining respective individual sequences $T_1, \ldots, T_K$ over the N successive frames, one time and frequency resource having to be allocated to one of the K individual transmissions per frame. Furthermore, the time and frequency resources of the wireless communications network can be represented thanks to a grid with time resources on one dimension and frequency resources on another dimension, the grid defining possible time and frequency resources sequences such that one transmission among the K individual transmissions being allowed per time resource. Furthermore, the method is performed by a managing device in charge of allocating time and frequency resources to perform transmissions within the wireless communications network, characterized in that the method comprises: computing a figure of merit $G(A, T_1, \ldots, T_K)$ for each possible set of the individual sequences $T_1, \ldots, T_K$ over the N successive frames on which respective frequency hopping sequences $[A_1, \ldots, A_N]=A$ apply, the figure of merit $G(A, T_1, \ldots, T_K)$ being representative of transmission robustness to interference and/or noise and/or path loss, and being determined under a constraint such that the frequency hopping sequences $A_1, \ldots, A_N$ are defined among a predefined set of allowable frequency hopping sequences which is a subset of all the time and frequency resources sequences made possible by said grid; and selecting the set of individual sequences $T_1, \ldots, T_K$ showing the best figure of merit $G(A, T_1, \ldots, T_K)$ according to a predefined criteria relative to the computed figures of merit $G(A, \ldots, T_K)$.

Thus, a frequency hopping sequence is applied over each frame for the K individual transmissions considered as a whole and the individual sequences $T_1, \ldots, T_K$ are determined so that the robustness of the K individual transmissions is improved. The individual sequences $T_1, \ldots, T_K$ therefore define respective individual frequency hopping sequences over the N successive frames, although the frequency hopping sequences $A_1, \ldots, A_N$ are applied on a per frame basis onto the N successive frames and for all the K individual transmissions.

According to a particular feature, said managing device performs: dynamically defining the frequency hopping sequences $A_1, \ldots, A_N$ jointly with the set of individual sequences $T_1, \ldots, T_K$; and determining signalling information intended to be broadcasted in the wireless communications network to provide information representative of each frequency hopping sequence $A_1, \ldots, A_N$ to be applied onto the respective N successive frames, said signalling information consisting of a code in a codebook representing an alphabet of said predefined set of allowable frequency hopping sequences, the alphabet having a size limited by a maximum size of the signalling information.

Thus, adapting the frequency hopping sequences $A_1, \ldots, A_N$ provides more flexibility when defining appropriate individual sequences $T_1, \ldots, T_K$.

According to a particular feature, the figure of merit $G(A, T_1, \ldots, T_K)$ is representative of a probability of occurrence of any individual transmission stop and is defined as follows:

$$G(A, T_1, \ldots, T_K) = \sum_{k=1}^{K} -\log(1 - P_k(A, T_k))$$

wherein k is an index for parsing the K individual transmissions, $P_k$ is a probability that the individual transmission designated by the index k stops in view of the frequency hopping sequences $A_1, \ldots, A_N$ and of the set of individual sequences $T_1, \ldots, T_K$. The method is further such that the managing device selects the set of individual sequences $T_1, \ldots, T_K$ minimizing the figure of merit $G(A, T_1, \ldots, T_K)$.

Thus, the figure of merit $G(A, T_1, \ldots, T_K)$ is easy to determine and allows implementing a cumulative distance approach.

According to a particular feature, allocating time and frequency resources being performed thanks to a search tree approach on the basis of a sliding window having a size equal to N frames, said method relies on a per branch investigation comprising: selecting a time and frequency resource of the N-th frame of the sliding window for one individual transmission k among the K individual transmissions, according to said predefined set of allowable frequency hopping sequences, wherein selecting said time and frequency resource corresponds to a branch of the search tree; computing a cumulative distance CD[k] as follows:

$$CD[k] = CD[k-1] - \log(1 - P_k(A', T'_k))$$

wherein $k=1, \ldots, K$ is an index for parsing the K individual transmissions, CD[0] is null, and wherein $A' = [A_1, \ldots, A'_N]$, with $A'_N$ being the frequency hopping sequence for the N-th frame considered when selecting the time and frequency resource to be tested, and wherein $T'_k$ is the individual sequence for the individual transmission k which is an aggregation of the time and frequency resources allocated to said individual transmission k in the N−1 first frames of the sliding window and of the selected time and frequency resource for the N-th frame of the sliding window. The method further comprises: moving forward in the investigation of the branch by considering the individual transmission represented by the index k+1 when the computed cumulative distance CD[k] is lower than, or equals to, a best cumulative distance BD computed during a preceding investigation of another branch in which all K individual transmissions have been considered; and starting investigating another branch when the computed cumulative distance CD[k] is greater than the best cumulative distance BD.

Thus, the search tree approach allows avoiding an exhaustive analysis.

According to a particular feature, when the search tree approach is prematurely interrupted, the frequency hopping sequence $A_N$ is defined as the frequency hopping sequence $A'_N$ corresponding to the best cumulative distance BD computed so far and the individual sequences $T_1, \ldots, T_K$ are defined as the individual sequences $T'_1, \ldots, T'_K$ also corresponding to the best cumulative distance BD computed so far.

Thus, appropriate individual sequences $T_1, \ldots, T_K$ can be determined even though a processing latency constraint shall be met.

According to a particular feature, the probability for one individual transmission among the K individual transmissions to stop is identical from one time resource to another in the N-th frame of a sliding window having a size equal to N frames, said method comprises: computing, for each individual transmission k among the K individual transmissions, a partial figure of merit G" for all possible frequency resources, the partial figure of merit G" being defined as follows:

$$G''(k, F_m) = (1 - P_k(F_m))$$

wherein $F_m$ represents a considered frequency resource and $P_k(F_m)$ represents a probability that the individual transmission k stops when using the frequency resource $F_m$; sorting, for each individual transmission k among the K individual transmissions, the frequency resources in increasing order of the partial figures of merit G"; selecting, for each individual transmission k among the K individual transmissions, the frequency resource $F_m$ appearing first among the sorted frequency resources; and, for each individual transmission k, the K individual transmissions being considered in decreasing order of the partial figures of merit G" respectively associated with the frequency resources $F_m$ selected for the K individual transmissions: determining a list of allowable frequency hopping sequences such that said allowable frequency hopping sequences match the frequency resources $F_m$ selected for the K individual transmissions, and when the list becomes empty, selecting the frequency resource $F_m$ appearing next among the sorted frequency resources $F_m$ for the individual transmission k. The method further comprises: selecting an allowable frequency hopping sequence from said list of allowable frequency hopping sequences, the selected allowable frequency hopping sequence then being the frequency hopping sequence $A_N$ to be applied to the N-th frame of the sliding window; and allocating time resources to the K individual transmissions, according to the selected allowable frequency hopping sequence.

Thus, the overall robustness of the K individual transmissions is improved by focusing first on individual transmissions showing a priori the highest risk to be stopped.

According to a particular feature, the probability for one individual transmission among the K individual transmissions to stop is identical from one time resource to another in the N-th frame of a sliding window having a size equal to N frames, said method comprises: computing, for each individual transmission k among the K individual transmissions, a partial figure of merit G" for all possible frequency resources, the partial figure of merit G" being defined as follows:

$$G''(k, F_m) = (1 - P_k(F_m))$$

wherein $F_m$ represents a considered frequency resource and $P_k(F_m)$ represents a probability that the individual transmission k stops when using the frequency resource $F_m$; sorting, for each individual transmission k among the K individual transmissions, the frequency resources in increasing order of the partial figures of merit G", in order to obtain for each individual transmission k an initial sorted list of the frequency resources; selecting, for each individual transmission k among the K individual transmissions, the frequency resource $F_m$ appearing first among the sorted frequency resources; sorting the K individual transmissions in decreasing order of the partial figures of merit G" respectively associated with the frequency resources $F_m$ selected for the K individual transmissions; and, for each individual transmission k, a processing phase of: determining a list of allowable frequency hopping sequences such that said allowable frequency hopping sequences match the frequency resources $F_m$ selected for the K individual transmissions, and when the list becomes empty, modifying the selected frequency resource $F_m$ for the individual transmission k by selecting the frequency resource $F_m$ appearing next among the sorted frequency resources $F_m$ for the individual transmission k; determining the figure of merit $G(A, T_1, \ldots, T_K)$ for each allowable frequency hopping sequence in the list of allowable frequency hopping sequences; and, when the selected frequency resource $F_m$ has been modified for at least one individual transmission: re-sorting the K individual transmissions in decreasing order of the partial figures of merit G" respectively associated with the frequency resources $F_m$ selected, or modified when applicable, for the K individual transmissions, in order to obtain a re-sorted list of the K individual transmissions; reiterating the processing phase on the basis of the initial sorted list of the frequency resources and on the basis of the re-sorted list of the K individual transmissions. The method further comprises: selecting the allowable frequency hopping sequence from said list of allowable frequency hopping sequences which shows the best figure of merit $G(A, T_1, \ldots, T_K)$, the selected allowable frequency hopping sequence then being the frequency hopping sequence $A_N$ to be applied to the N-th frame of the sliding window; and allocating time resources to the K individual transmissions, according to the selected allowable frequency hopping sequence.

Thus, the overall robustness of the K individual transmissions is improved by focusing first on individual transmissions showing a priori the highest risk to be stopped, but by also limiting degradation of expected performances for the individual transmissions showing a priori the lowest risk to be stopped.

According to a particular feature, the signalling information imposes having blocks of consecutive time resources used in conjunction with a same frequency resource, the probability for one individual transmission among the K individual transmissions to stop is identical from one time resource to another in the N-th frame of a sliding window having a size equal to N frames, wherein a frequency assignment vector FAV is intended to indicate, for each block of consecutive time resources, what frequency resource is associated with, the frequency assignment vector FAV having a quantity of dimensions equal to the quantity of blocks in each frame, wherein a transmission assignment counter TAC intended to indicate, for each block of consecutive time resources, how many individual transmissions among the K individual transmissions are assigned to the frequency resource associated with said block, the transmission assignment counter TAC having a quantity of dimensions equal to the quantity of blocks in each frame. The method comprises: computing, for each individual transmission k among the K individual transmissions, a partial figure of merit G" for all possible frequency resources, the partial figure of merit G" being defined as follows:

$$G"(k, F_m) = (1 - P_k(F_m))$$

wherein $F_m$ represents a considered frequency resource and $P_k(F_m)$ represents a probability that the individual transmission k stops when using the frequency resource $F_m$; sorting, for each individual transmission k among the K individual transmissions, the frequency resources in increasing order of the partial figures of merit G"; selecting, for each individual transmission k among the K individual transmissions, the frequency resource $F_m$ appearing first among the sorted frequency resources; sorting the K individual transmissions in decreasing order of the partial figures of merit G" respectively associated with the frequency resources $F_m$ selected for the K individual transmissions; and, for each individual transmission k, a processing phase of: checking whether there exists a block i such that FAV[i] equals to the frequency resource $F_m$ selected for the individual transmission k; incrementing by one unit TAC[i], when there exists such a block i and when TAC[i] has not reached a maximum quantity of time resources in the block i; and, when such a block i doesn't exist, or when such a block i exists and TAC[i] has reached the maximum quantity of time resources in the block i: checking whether there exists a block j such that FAV[j] is null; assigning the frequency resource $F_m$ selected for the individual transmission k to the block j by assigning said frequency resource $F_m$ to FAV[j] and incrementing by one unit TAC[j], when there exists such a block j; selecting the frequency resource $F_m$ appearing next among the sorted frequency resources $F_m$ for the individual transmission k, when such a block j doesn't exist and reiterating the processing phase for said individual transmission k. The method further comprises: allocating the frequency hopping sequence $A_N$ for the N-th frame of the sliding window and the individual sequences $T_1, \ldots, T_K$ which correspond to the frequency assignment vector FAV.

Thus, time and frequency resources allocation can be performed to improve robustness of the overall K individual transmissions, although the signalling information imposes having blocks of consecutive time resources used in conjunction with a same frequency resource.

According to a particular feature, considering the N-th frame of a sliding window having a size equal to N frames, said method comprises: obtaining initial frequency hopping sequences $[A_1, \ldots, A_{N-1}, A'_N] = A'$ and a set of initial individual sequences $T'_1, \ldots, T'_K$, for the respective K individual transmissions, over the sliding window, wherein the initial frequency hopping sequences $A_1, \ldots, A_{N-1}$ result from time and frequency resources allocation for the N−1 first frames of the sliding window and wherein the time and frequency resources of the individual sequences $T'_1, \ldots, T'_K$ for the N−1 first frames of the sliding window result from the time and frequency resources allocation for said N−1 first frames; computing a partial figure of merit $G°$ for each individual transmission k of the K individual transmissions, as follows:

$$G°(k, TS_m, F_m) = (1 - P_k(TS_m, F_m))$$

wherein $F_m$ represents the frequency resource that has been attributed to the individual transmission k for the N-th frame in the initial individual sequences $T'_k$, $TS_m$ represents the time resource that has been attributed to the individual transmission k for the N-th frame in the initial individual sequences $T'_k$ and $P_k(TS_m, F_m)$ represents a probability that the individual transmission k stops when using the time and frequency resource $(TS_m, F_m)$; determining the figure of merit $G(A', T'_1, \ldots, T'_K)$ according to the initial frequency hopping sequences $[A_1, A_{N-1}, A'_N] = A'$ and the set of initial individual sequences $T'_1, \ldots, T'_K$; and, for each individual transmission k among the K individual transmissions, considered for each allowable frequency hopping sequence for the N-th frame of the sliding window, in decreasing order of the partial figures of merit $G°$: determining possible permutations, according to the frequency hopping sequence $A'_N$, between the time and frequency resource attributed to the selected individual transmission for the N-th frame in the initial individual sequences $T'_k$ and another time and frequency resource attributed to another individual transmission for the N-th frame; and determining the figure of merit G for each determined possible permutation. The method further comprises, once a predefined time period has elapsed: allocating the frequency hopping sequence $A_N$ for the N-th frame of the sliding window and the individual sequences $T_1, \ldots, T_K$ which led to the best figure of merit G according to said predefined criteria.

Thus, time and frequency resources allocation can be performed to improve robustness of the overall K individual transmissions in a simple manner, although said allocation has to be performed within a predefined time period.

According to a particular feature, the figure of merit $G(A, T_1, \ldots, T_K)$ is representative of a probability of non-occurrence of any individual transmission stop and is defined as follows:

$$G(A, T_1, \ldots, T_K) = \prod_{k=1}^{K}(1 - P_k(A, T_k))$$

wherein k is an index for parsing the K individual transmissions, $P_k$ is a probability that the individual transmission designated by the index k stops in view of the frequency hopping sequences $A_1, \ldots, A_N$ and of the set of individual sequences $T_1, \ldots, T_K$. The method is further such that the managing device selects the set of individual sequences $T_1, \ldots, T_K$ maximizing the figure of merit $G(A, T_1, \ldots, T_K)$.

Thus, robustness of the overall K individual transmissions can be improved in a simple manner by relying on a genetic approach.

According to a particular feature, the frequency hopping sequences $A_1, \ldots, A_N$ are statically defined.

The invention also concerns a device for determining time and frequency resources from amongst time and frequency resources of a wireless communications network to be used for performing K individual transmissions over N successive frames in said wireless communications network, the time and frequency resources to be used for performing the K individual transmissions defining respective individual sequences $T_1, \ldots, T_K$ over the N successive frames, one time and frequency resource having to be allocated to one of the K individual transmissions per frame. The time and frequency resources of the wireless communications network can be represented thanks to a grid with time resources on one dimension and frequency resources on another dimension, the grid defining possible time and frequency resources sequences such that one transmission among the K individual transmissions being allowed per time resource. The device comprises: means for computing a figure of merit $G(A, T_1, \ldots, T_K)$ for each possible set of the individual sequences $T_1, \ldots, T_K$ over the N successive frames on which respective frequency hopping sequences $[A_1, \ldots, A_N] = A$ apply, the figure of merit $G(A, T_1, \ldots, T_K)$ being representative of transmission robustness to interference and/or noise and/or path loss, and being determined under a constraint such that the frequency hopping sequences $A_1, \ldots, A_N$ are defined among a predefined set of allowable frequency hopping sequences which is a subset of all the time and frequency resources sequences made possible by said grid; and means for selecting the set of individual sequences $T_1, \ldots, T_K$ showing the best figure of merit $G(A, T_1, \ldots, T_K)$ according to a predefined criteria relative to the computed figures of merit $G(A, T_1, \ldots, T_K)$.

Since the features related to the device are similar to those already mentioned with regard to the corresponding aforementioned method, the corresponding advantages are not repeated here.

Figure 2:
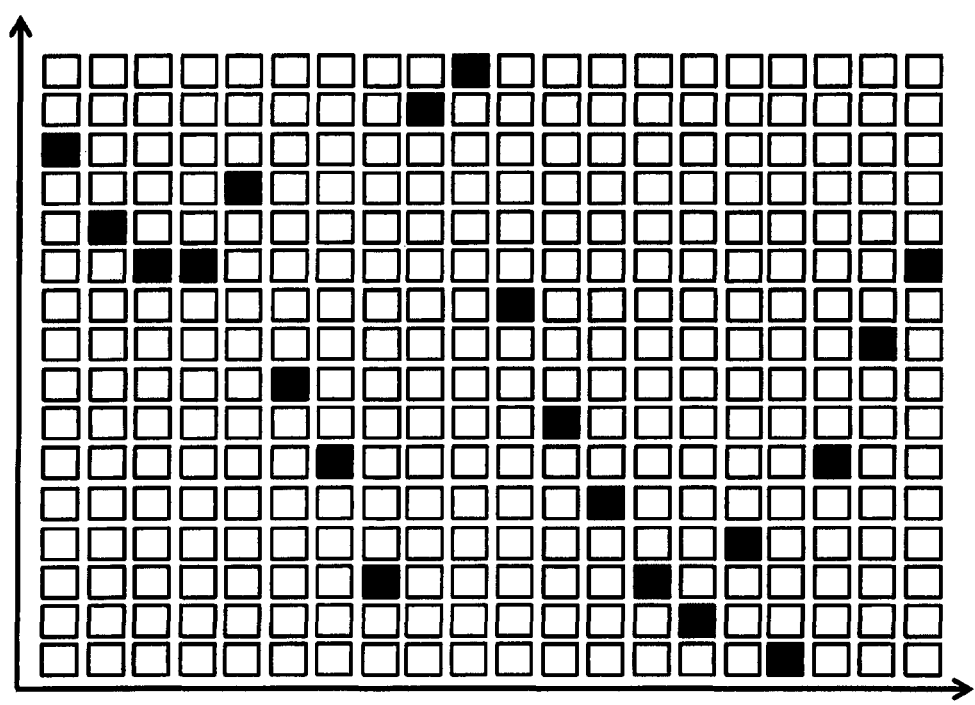
Figure 3:
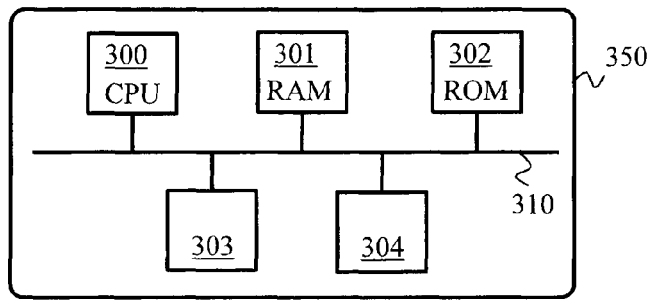
Figure 4:
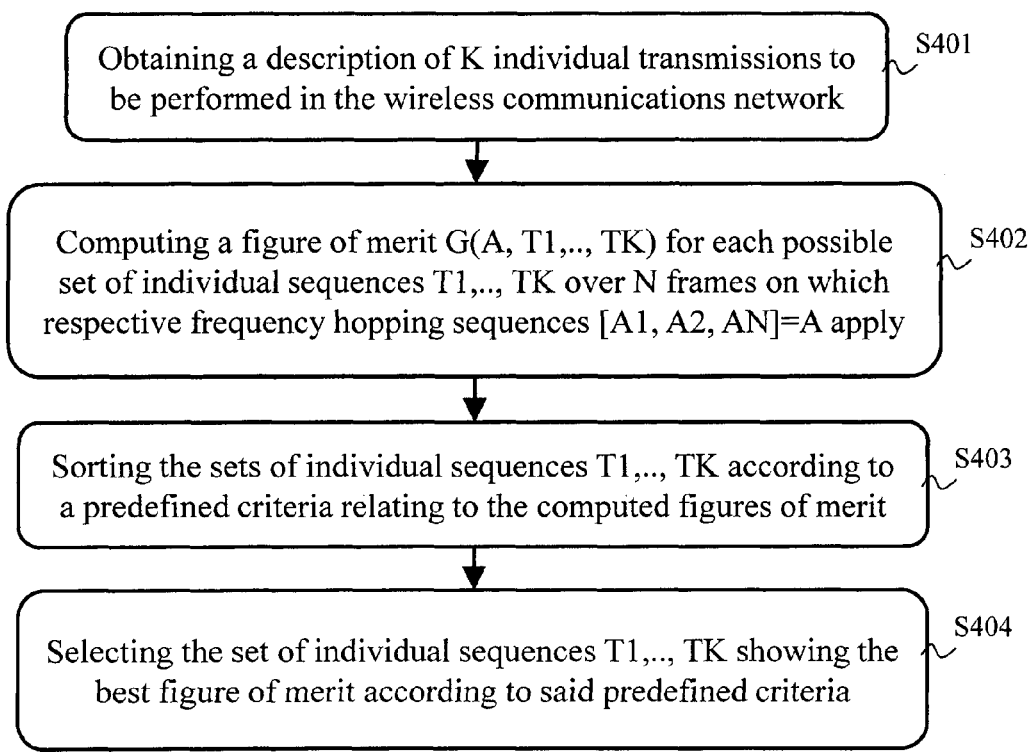
Figure 5:
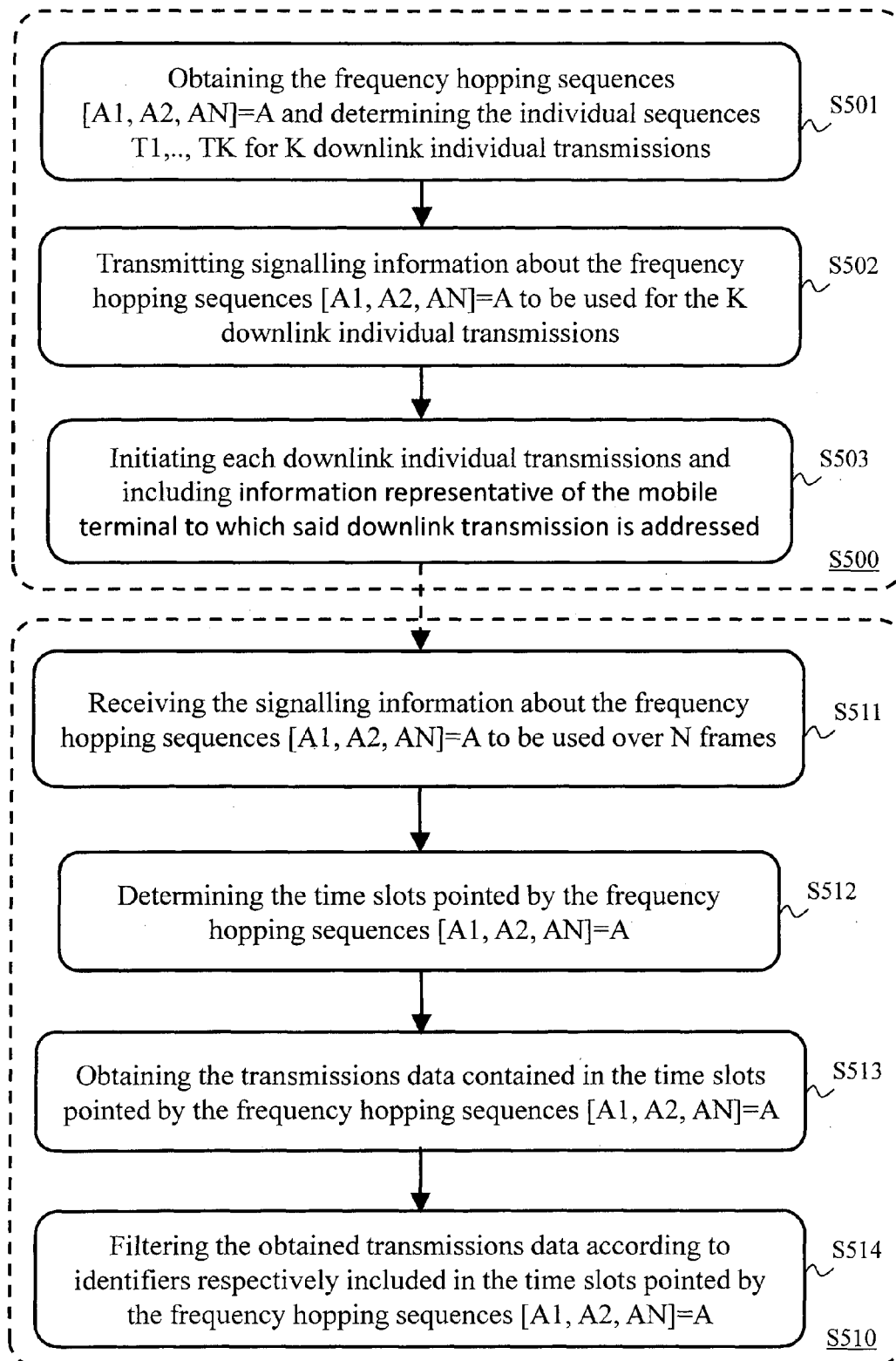
Figure 6:
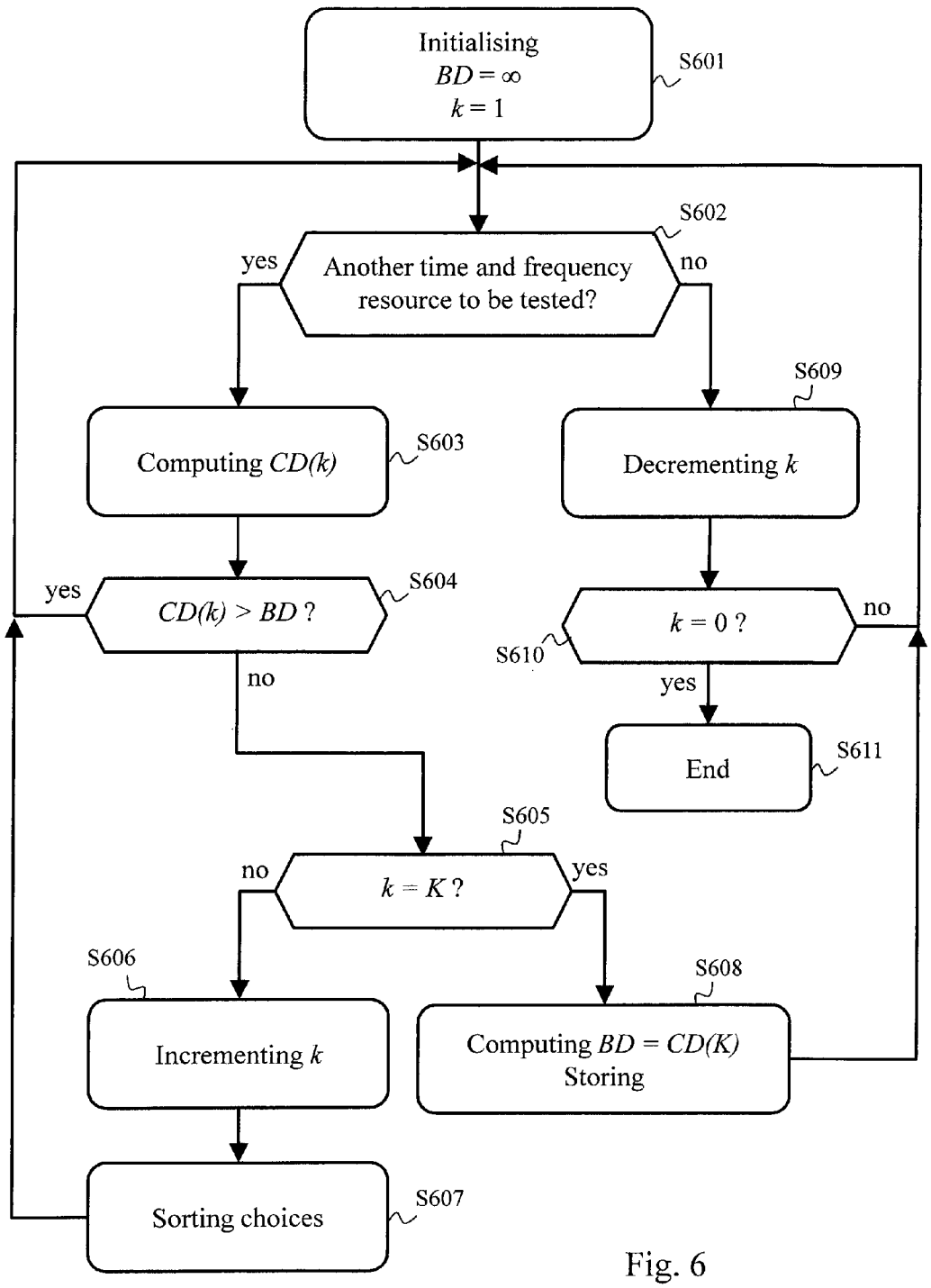
Figure 7:
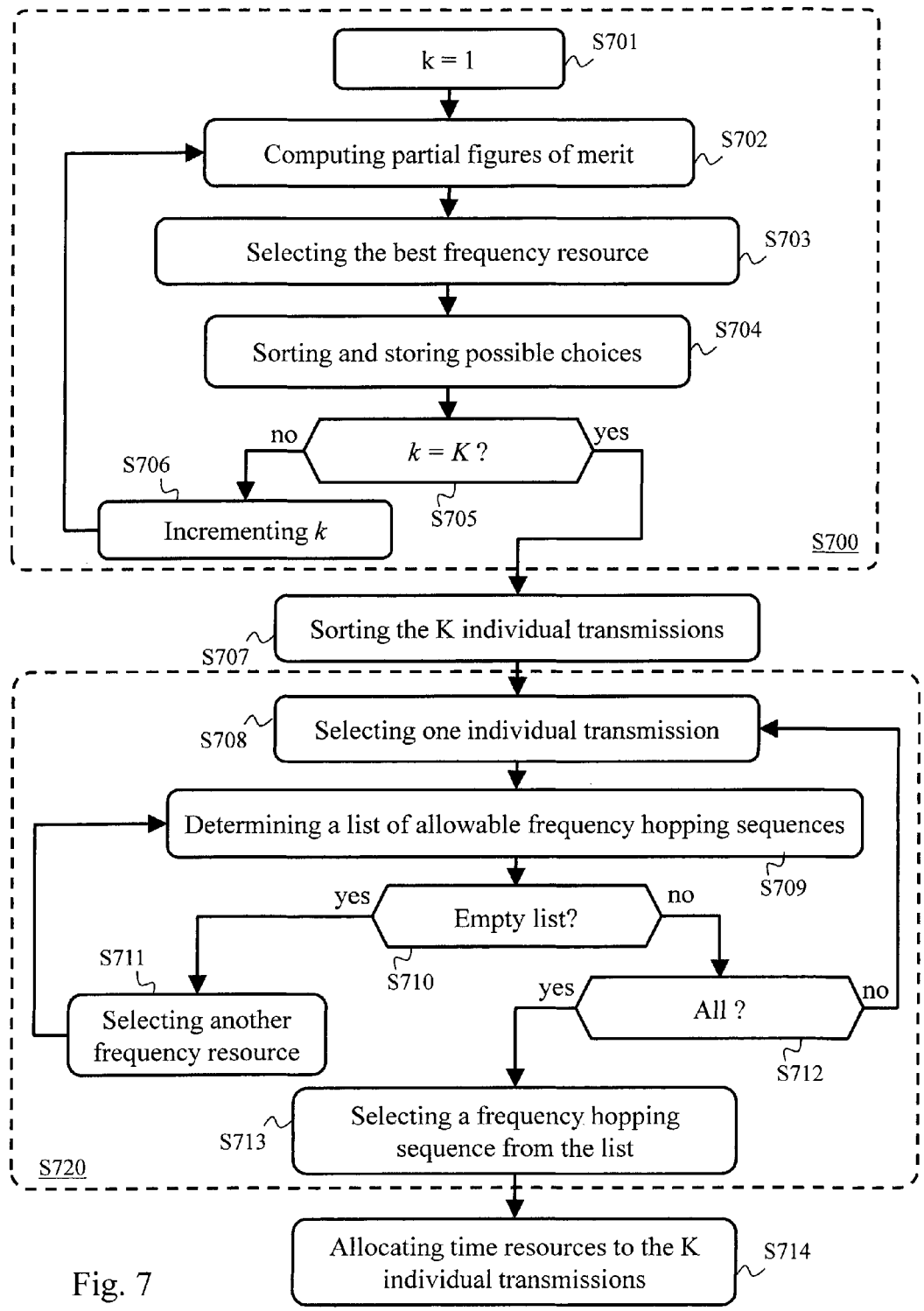
Figure 8:
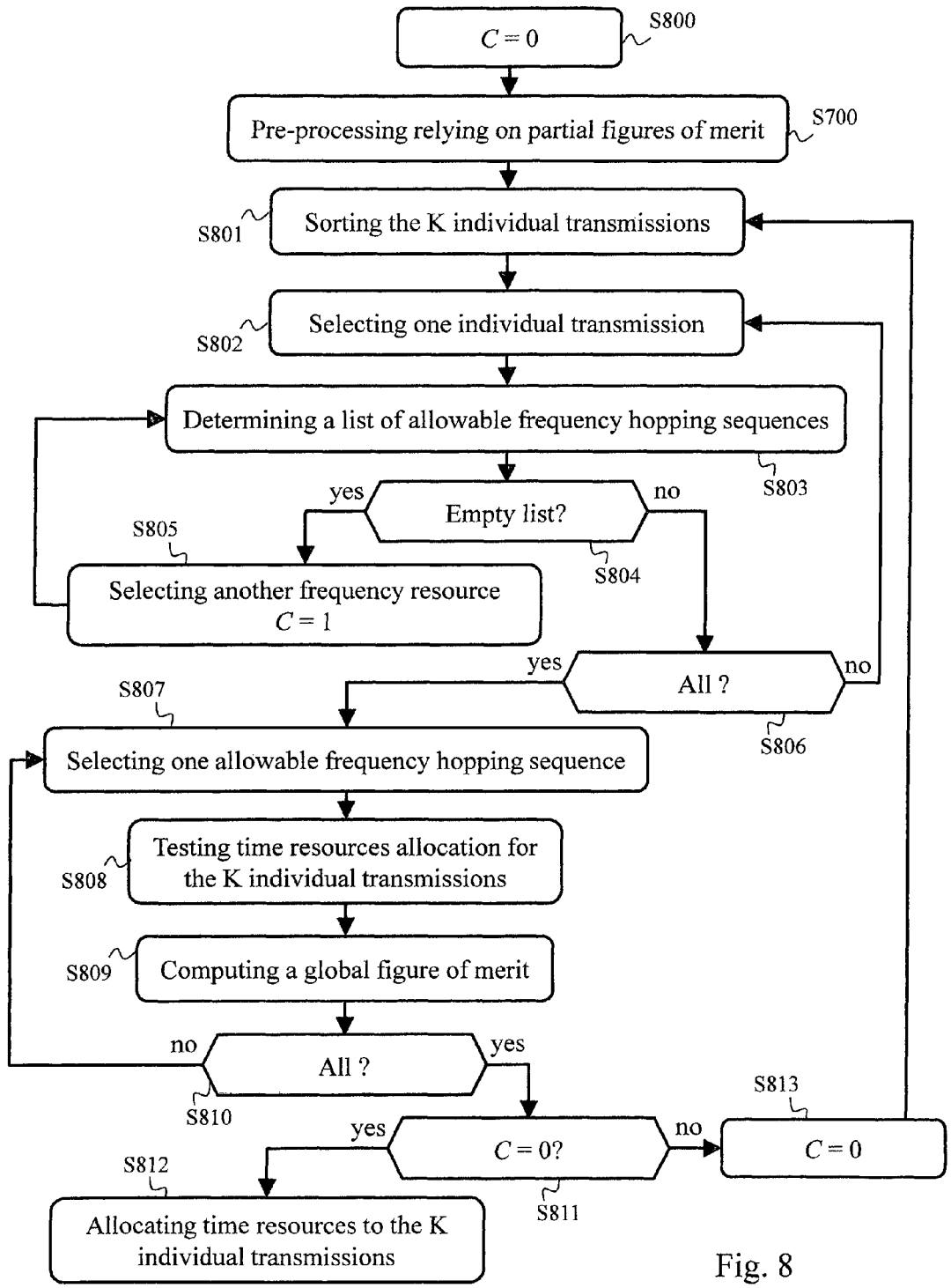
Figure 9:
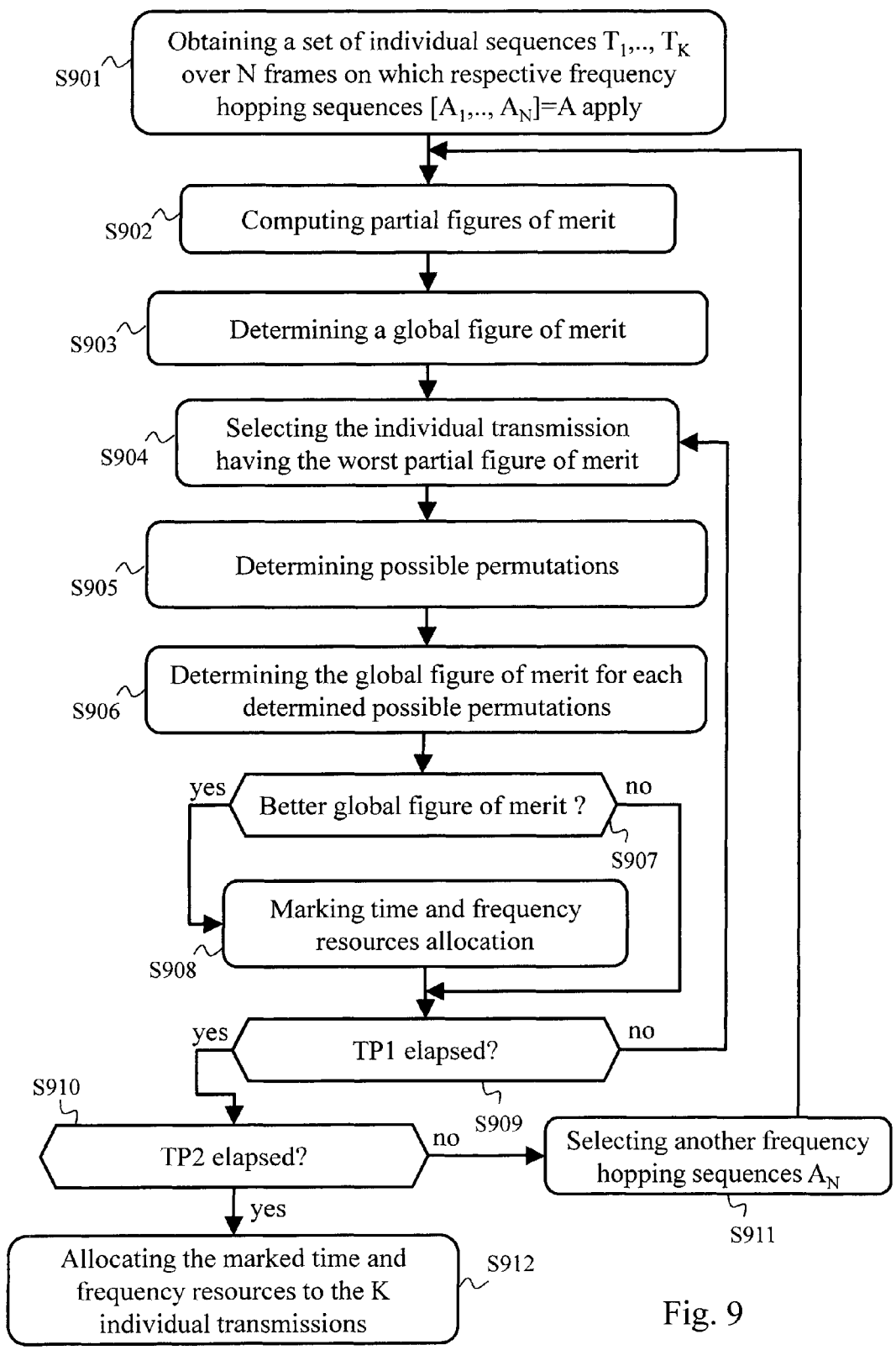
Figure 10:
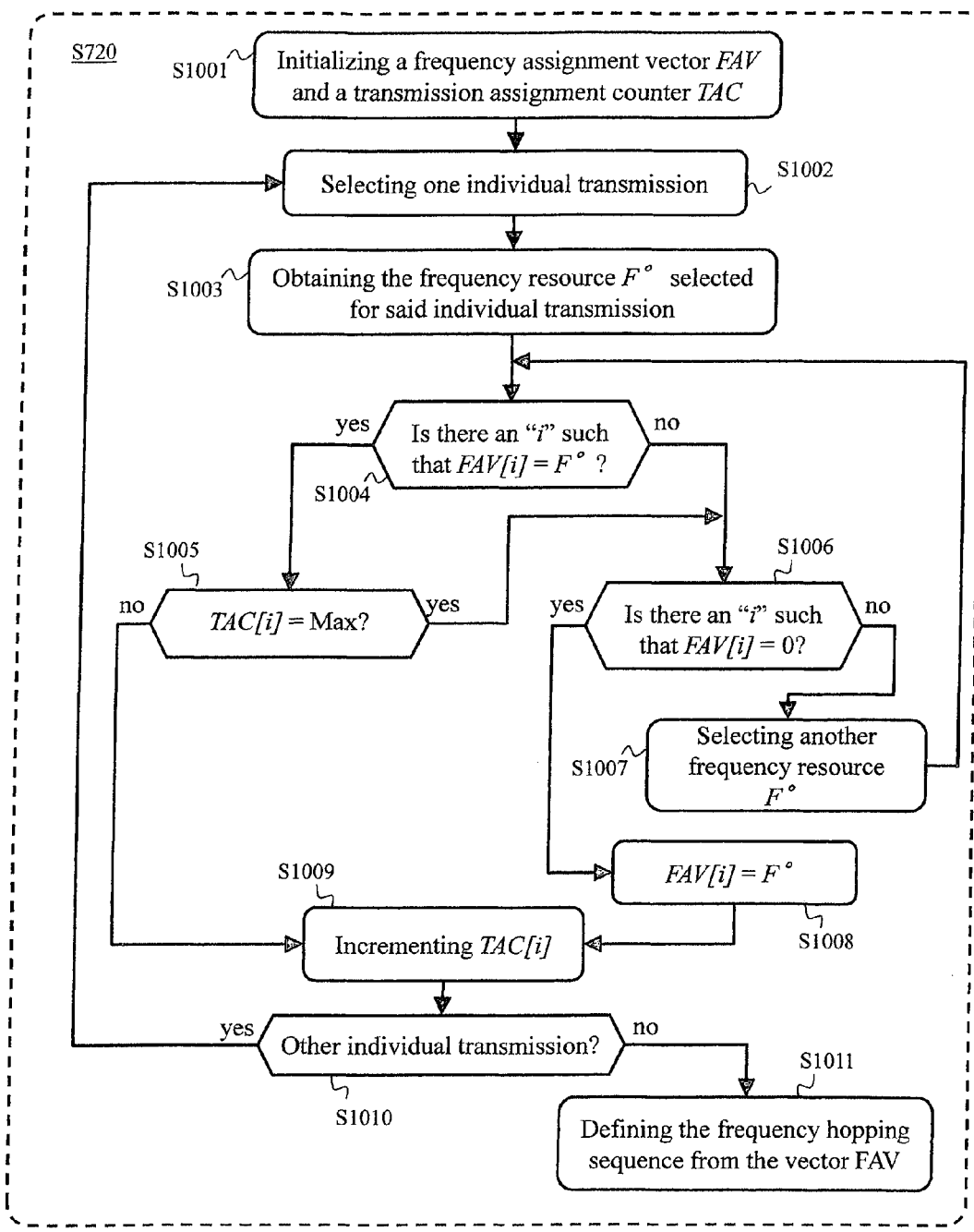

The characteristics of the invention will emerge more clearly from a reading of the following description of an example of embodiment, said description being produced with reference to the accompanying drawings, among which:

FIG. 1 schematically represents a wireless communications network in which the present invention may be implemented;

FIG. 2 schematically represents a grid of time and frequency resources of the wireless communications network;

FIG. 3 schematically represents a communication device of the wireless communications network;

FIG. 4 schematically represents an algorithm for determining time and frequency resources to be used for performing transmissions within the wireless communications network;

FIG. 5 schematically represents an algorithm for determining time and frequency resources to be used for performing downlink transmissions within the wireless communications network and for identifying said time and frequency resources, in one embodiment of the invention;

FIG. 6 schematically represents an algorithm for determining time and frequency resources to be used for performing transmissions within the wireless communications network, by relying on a branch and bound approach;

FIG. 7 schematically represents an algorithm for determining time and frequency resources to be used for performing transmissions within the wireless communications network, by relying on a one-shot decision for each time resource in an N-th frame in a sliding window of N successive frames;

FIG. 8 schematically represents an algorithm for determining time and frequency resources to be used for performing transmissions within the wireless communications network, by relying on an iterative decision for each time resource in an N-th frame in a sliding window of N successive frames;

FIG. 9 schematically represents an algorithm for determining time and frequency resources to be used for performing transmissions within the wireless communications network, by relying on a genetic approach; and FIG. 10 schematically represents an algorithm for allocating time and frequency resources to be used for performing transmissions within the wireless communications network, when signalling of frequency hopping sequences imposes having consecutive time resources used in conjunction with a same frequency resource.

It is considered herein a wireless communications network providing time and frequency resources for performing transmissions within the wireless communications network. As already mentioned, time and frequency resources can be represented on a per frame basis by a grid, with frequency resources being represented on one axis and time resources being represented on another axis. For each frame, a frequency hopping sequence defines which time and frequency resources among the time and frequency resources of the grid have to be shared by said transmissions. It is further considered that either no modification of frequency hopping sequence can be made for a considered frame, or in which only a subset of the time and frequency resources sequences made possible by the grid can be signalled for the considered frame. It is further considered herein that K individual transmissions have to be performed over at least N successive frames in the wireless communications network. Individual transmissions means that said transmissions are not correlated to each other, e.g. no constraint on whether one or another of said individual transmissions is performed first within one frame, although it is considered that each one of the K individual transmissions shall be allocated one time and frequency resource per frame.

FIG. 1 schematically represents a wireless communications network in which the present invention may be implemented.

The wireless communications network shown in FIG. 1 comprises a server 100, plural access points APs and plural mobile terminals. Two APs 110, 111 are illustratively represented and two mobile terminals 120, 121 are illustratively represented too.

In FIG. 1, the mobile terminal 120 communicates within the wireless communications network via the AP 110 and the mobile terminal 121 communicates within the wireless communications network via the AP 111, as represented by solid line arrows in FIG. 1. From the standpoint of the mobile terminal 121, downlink communications from the AP 110 to the mobile terminal 120 may interfere with the downlink communications from the AP 111 to the mobile terminal 121. From the standpoint of the mobile terminal 120, downlink communications from the AP 111 to the mobile terminal 121 may interfere with the downlink communications from the AP 110 to the mobile terminal 120. Such interference is represented in FIG. 1 by dashed line arrows. Other interference may occur due to other interferers located in the vicinity of the mobile terminals and/or in the vicinity of the APs.

Coping with such interference, or noise or path loss, can be performed thanks to frequency hopping when allocating time and frequency resources for transmissions. Frequency hopping provides diversity in terms of frequency usage, which allows the transmissions to be robust to narrowband interference.

The server 100 is in charge of performing time and frequency resources allocations within the wireless communications network. To achieve this, the server 100 communicates with the APs 110, 111 so as to receive and process allocation requests. In a variant, the allocations of time and frequency resources are not performed by a server to which the APs are connected, but by the APs themselves.

The device in charge of performing time and frequency resources allocations within the wireless communications network may be referred to as managing device.

Although only mobile terminal is represented in FIG. 1 per cell managed by each AP, the present invention is able to cope with plural mobile terminals per cell.

In an illustrative manner, the mobile terminals considered herein may be communication devices installed in trains performing journeys on railroads on the edge of which the APs 110, 111 are located.

As already mentioned, the time and frequency resources that may be used for performing transmissions between the AP 110 and the mobile terminal 120 and transmissions between the AP 111 and the mobile terminal 121 can be represented using a grid of time and frequency resources, as illustratively represented in FIG. 2.

In FIG. 2, the frequency resources are represented as ordinates (vertical axis) and the time resources are represented as abscissa (horizontal axis). Illustratively, the frequency band from 2400 MHz to 2480 MHz is divided into sixteen frequency resources of 5 MHz each. In other words, each row of the grid shown in FIG. 2 represents a 5 MHz wide frequency resource. Time is divided into frames, themselves illustratively divided into time slots of 4 ms each. A frame of twenty time slots is represented by the grid shown in FIG. 2. Each time slot is considered as a time resource. In other words, each column of the grid shown in FIG. 2 represents a 4 ms wide time resource. Each square represented in the grid of FIG. 2 therefore corresponds to a time and frequency resource of 5 MHz over 4 ms.

The K individual transmissions shall be performed using time and frequency resources of said grid, according to a frequency hopping sequence on a per-frame basis. Black squares on FIG. 2 shows an illustrative example of such a frequency hopping sequence over the represented frame of twenty time slots.

The frequency hopping sequence to be applied on a given frame may be statically or dynamically defined. When the frequency hopping sequence to be applied on the given frame is dynamically defined, signalling information has to be transmitted from the APs and the mobile terminals in order to indicate the frequency hopping sequence to be applied on the given frame, so that said mobile terminals are able to determine which time and frequency resources of the grid are used to perform the transmissions. In this case, such signalling information consists of a code in a codebook representing an alphabet of all allowable frequency hopping sequences for the given frame. The part of the frame in which signalling information is provided is of limited size, which therefore reduces the quantity of allowable frequency hopping sequences compared with an exhaustive quantity of frequency hopping sequences made possible by the grid, and therefore limits the size of the alphabet.

The frequency hopping sequence shown in FIG. 2 doesn't take into account time periods of the frame that may be used for transmitting signalling information. In a particular embodiment, the frame includes a predefined time period dedicated to broadcast information, such as signalling information; such a predefined time period is referred to as broadcast channel (BCH).

In a preferred embodiment, when the frequency hopping sequence is dynamically defined, the aforementioned broadcast channel BCH is used to indicate the frequency hopping sequence to be effectively applied for the frame to which said broadcast channel BCH belongs. The broadcast channel BCH is therefore located prior to the time slots used for performing the K individual transmissions. In a variant, the broadcast channel BCH is used to indicate the frequency hopping sequence to be effectively applied for a frame later than the one to which said broadcast channel BCH belongs. The broadcast channel BCH can therefore be located elsewhere inside the frame.

FIG. 3 schematically represents a communication device 350 of the wireless communications network. The communication device 350 may be a representation of an AP, such as the AP 110, and/or may be a representation of a mobile terminal, such as the mobile terminal 120, and/or may be a representation of the server 100.

According to the shown architecture, the communication device 350 comprises the following components interconnected by a communications bus 310: a processor, microprocessor, microcontroller or CPU (Central Processing Unit) 300; a RAM (Random-Access Memory) 301; a ROM (Read-Only Memory) 302; an HDD (Hard-Disk Drive) or an SD (Secure Digital) card reader 303, or any other device adapted to read information stored on storage means; a set of at least one communication interface 304.

The set of at least one communication interface 304 allows the communication device to communicate with at least one other communication device of the wireless communications network.

CPU 300 is capable of executing instructions loaded into RAM 301 from ROM 302 or from an external memory, such as an SD card. After the communication device 350 has been powered on, CPU 300 is capable of reading instructions from RAM 301 and executing these instructions. The instructions form one computer program that causes CPU 300, and thus the communication device 350, to perform some or all of the steps of the algorithms described hereafter.

Any and all steps of the algorithms described hereafter may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 4 schematically represents an algorithm for determining time and frequency resources to be used for performing the K individual transmissions within the wireless communications network. Let's consider that the algorithm of FIG. 4 is executed by the server 100.

The purpose of the algorithm of FIG. 4 is to allocate time and frequency resources to each one of the K individual transmissions, while ensuring that any time and frequency resource be not allocated to two or more transmissions among the K individual transmissions. One time and frequency resources per frame has to be allocated to each one of the K individual transmissions.

In a step S401, the server 100 obtains a description of the K individual transmissions to be performed within the wireless communications network.

In a following step S402, the server 100 computes a figure of merit $G(A, T_1, \ldots, T_K)$ for each possible set of individual sequences $T_1, \ldots, T_K$, for the respective K individual transmissions, over N successive frames on which respective frequency hopping sequences $[A_1, \ldots, A_N]=A$ apply. Each individual sequence $T_k$ is the sequence of time and frequency resources allocated over the N successive frames for the individual transmission k, with k an index from 1 to K. The figure of merit is representative of transmission robustness to interference and/or noise and/or path loss. In other words, the server 100 attempts to determine the appropriate individual sequences $T_1, \ldots, T_K$ for the respective K individual transmissions over the N successive frames. Respective frequency hopping sequences $A_1, \ldots, A_N$ apply over the N successive frames, wherein the frequency hopping sequences $A_1, \ldots, A_N$ represent time and frequency resources shared by the K individual transmissions. The server 100 relies on the figure of merit G to determine the appropriate individual sequences $T_1, \ldots, T_K$, i.e. which time and frequency resource(s) as defined by the frequency hopping sequences $A_1, \ldots, A_N$ is(are) allocated to which transmission among the K individual transmissions. To achieve this, the server 100 determines the figure of merit G for each possible set of individual sequences $T_1, \ldots, T_K$.

In a particular embodiment, the figure of merit $G(A, T_1, \ldots, T_K)$ takes into account a probability that any one of the K individual transmissions stops due to interference and/or noise and/or path loss. For instance, it is considered that one of the K individual transmissions stops when no data is being received by the concerned addressee in the scope of said transmission during a predefined time period. Such predefined time period is for example defined as a quantity of successive frames, e.g. fifteen successive frames having each a length of 100 ms.

In a further particular embodiment, the server 100 considers that, when any one of the K individual transmissions stops due to interference and/or noise and/or path loss, all the K individual transmissions are stopped. The figure of merit $G(A, T_1, \ldots, T_K)$ may therefore be expressed as a probability of non-occurrence of any individual transmission stop, which should be maximized, as follows:

$$(A, T_1, \ldots, T_K) = \arg\max(G(A, T_1, \ldots, T_K))$$

with $$G(A, T_1, \ldots, T_K) = \prod_{k=1}^{K}(1 - P_k(A, T_k))$$

wherein k is an index for parsing the considered K individual transmissions, $P_k$ is the probability that the individual transmission designated by the index k stops in view of the frequency hopping sequences $[A_1, \ldots, A_N]=A$ and of the considered set of individual sequences $T_1, \ldots, T_K$.

The probability $P_k(A, T_k)$ is typically different from one transmission to another among the considered K individual transmissions. Indeed, the effective positions of the mobile terminals relatively to the APs, the transmit power of the involved signals, and other interference-related parameters, are typically different from one transmission to another among the considered K individual transmissions.

As expressed by the formula above, the probability of non stopping any one of the K individual transmissions is the product of the respective probabilities of non stopping the K individual transmissions. Such probabilities are defined according to physical layer parameters and further depend on expected signal-to-interference-plus-noise ratio (SINR). When one AP communicates with several mobile terminals at different respective positions, even when the same frequency resource is used for all said mobile terminals, the respective probabilities $P_k$ are different from each other.

In a following optional step S403, the server 100 sorts the possible sets of individual sequences $T_1, \ldots, T_K$ according to a predefined criteria relating to the computed figures of merit $G(A, T_1, \ldots, T_K)$. For instance, the server 100 sorts the possible sets of individual sequences $T_1, \ldots, T_K$ in increasing order in view of the computed figures of merit $G(A, T_1, \ldots, T_K)$, or in decreasing order in view of the computed figures of merit $G(A, T_1, \ldots, T_K)$. Sorting the possible sets of individual sequences $T_1, \ldots, T_K$ allows easing execution of a following step S404.

In the following step S404, the server 100 selects the set of individual sequences $T_1, \ldots, T_K$ showing the best figure of merit $G(A, T_1, \ldots, T_K)$ according to said predefined criteria. It thus results in distributing the K individual transmissions over the time and frequency resources defined by the frequency hopping sequences $A_1, \ldots, A_N$ in such a way that, over the N successive frames, overall robustness of the K individual transmissions is improved.

As detailed hereafter, the frequency hopping sequences $A_1, \ldots, A_N$ may be statically defined, and in this case, the appropriate individual sequences $T_1, \ldots, T_K$ are defined according to the time and frequency resources statically defined by the frequency hopping sequences $A_1, \ldots, A_N$ so as to increase overall robustness of the K individual transmissions. The frequency hopping sequences $A_1, \ldots, A_N$ may, in a variant, be dynamically defined, and in this case, the appropriate individual sequences $T_1, \ldots, T_K$ and the frequency hopping sequences $A_1, \ldots, A_N$ are jointly determined so as to increase overall robustness of the K individual transmissions.

Defining the set of individual sequences $T_1, \ldots, T_K$ to be applied may be performed per cycle of N successive frames. In other words, the server 100 determines the appropriate set of individual sequences $T_1, \ldots, T_K$ for a first cycle of N successive frames, and then determines the appropriate set of individual sequences $T_1, \ldots, T_K$ for a distinct second cycle of N successive frames, the second cycle immediately following in sequence the first cycle.

In a variant, defining the set of individual sequences $T_1, \ldots, T_K$ to be applied may be performed on the basis of a sliding window having a depth of N successive frames. In other words, the server 100 determines the appropriate set of individual sequences $T_1, \ldots, T_K$ for a first cycle of N successive frames, and then determines, for each following frame, the appropriate set of individual sequences $T_1, \ldots, T_K$ to be applied by taking into account the time and frequency resources allocations performed by the server 100 for the N−1 frames preceding said following frame.

In a similar way, the frequency hopping sequences $A_1, \ldots, A_N$ may be determined on the basis of successive cycles of N successive frames, or on the basis of a sliding window having a depth of N successive frames.

The algorithm of FIG. 4 may rely on an exhaustive search of the most appropriate parameters $(A, T_1, \ldots, T_K)$ from amongst all allowable combinations of time and frequency resources. In a variant, by reusing the definition of the figure of merit $G(A, T_1, \ldots, T_K)$ above, complexity of the search can be reduced by relying on a cumulative distance computation. To do so, the server 100 attempts minimizing a figure of merit $G'(A, T_1, \ldots, T_K)$ representative of a probability of occurrence of any individual transmission stop and is defined as follows:

$$(A, T_1, \ldots, T_K) = \arg\min(G'(A, T_1, \ldots, T_K))$$

with $$G'(A, T_1, \ldots, T_K) = -\log G(A, T_1, \ldots, T_K)$$

which leads to $$G'(A, T_1, \ldots, T_K) = \sum_{k=1}^{K} -\log(1 - P_k(A, T_k))$$

Such a figure of merit G' represents a cumulative distance and a tree search algorithm may therefore be applied to select an appropriate set of parameters $(A, T_1, \ldots, T_K)$. A branch and bound algorithm is detailed hereafter with regard to FIG. 6 in such a context.

FIG. 5 schematically represents an algorithm for determining time and frequency resources to be used for performing downlink transmissions within the wireless communications network and for identifying said time and frequency resources, in one embodiment of the invention. Let's consider, in the context of the algorithm of FIG. 5 that the K individual transmissions are downlink transmissions toward K respective mobile terminals.

The algorithm shown in FIG. 5 is divided into two processes. A first process S500 is executed by the managing device. A second process S510 is executed by any mobile terminal that may be concerned by any one of the K individual downlink transmissions. Let's consider that the first process S500 is executed by the AP 110 and that the second process S510 is executed by the mobile terminal 120.

The first process S500 starts in a step S501 and ends in a step S503.

In the step S501, the AP 110 obtains information representative of the frequency hopping sequences $A_1, \ldots, A_N$ to be applied for the N successive frames and obtains information representative of the appropriate individual sequences $T_1, \ldots, T_K$ for the respective K individual downlink transmissions over the N successive frames. As already stated, the frequency hopping sequences $A_1, \ldots, A_N$ may be statically defined or dynamically defined. Let's consider in the remaining description of the algorithm shown in FIG. 5 that the frequency hopping sequences $A_1, \ldots, A_N$ are dynamically defined by the server 100 and that the server 100 transmits to the AP 110 the information representative of the applicable frequency hopping sequences $A_1, \ldots, A_N$, as well as the information representative of the appropriate individual sequences $T_1, \ldots, T_K$. Signalling information has hence to be transmitted by the AP 110 within the wireless communications network in order to propagate therein information representative of the applicable frequency hopping sequences $A_1, \ldots, A_N$. As already mentioned, the signalling information is limited in size in such a way that only a subset of frequency hopping sequences from amongst the exhaustive combinations of time and frequency resources made possible by the grid is allowable.

In a following step S502, the AP 110 transmits the signalling information about the frequency hopping sequences $A_1, \ldots, A_N$ to be applied onto the N successive frames in order to notify the time and frequency resources to be used by the K individual downlink transmissions. It is thus considered in the context of the algorithm of FIG. 5 that the effective allocation of the time and frequency resources for each one of the K individual downlink transmissions is not indicated in said signalling information. In other words, no indication of the determined individual sequences $T_1, \ldots, T_K$ is present in the signalling information. The signalling information is for instance transmitted in the aforementioned broadcast channel BCH.

In the step S503, the AP 110 initiates the K individual downlink transmissions according to the individual sequences $T_1, \ldots, T_K$ (and consequently, according to the frequency hopping sequences $A_1, \ldots, A_N$ for the N successive frames). In each time and frequency resource of the individual sequences $T_1, \ldots, T_K$ the AP 110 includes information representative of the mobile terminal to which the downlink transmission concerned by said time and frequency resource is addressed.

The second process S510 starts in a step S511 and ends in a step S514.

In the step S511, the mobile terminal 120 receives the signalling information as transmitted by the AP 110 in the step S502. The signalling information is for instance received by the mobile terminal 120 via the aforementioned broadcast channel BCH.

In a following step S512, the mobile terminal 120 obtains, from the received signalling information, information representative of the frequency hopping sequences $A_1, \ldots, A_N$ to be applied onto the N successive frames. In other words, the mobile terminal 120 obtains information representative of the time and frequency resources allocated to the K individual downlink transmissions considered as a whole. As the mobile terminal 120 is not concerned by all the K individual downlink transmissions, the mobile terminal 120 needs to know which time and frequency resources of the frequency hopping sequences $A_1, \ldots, A_N$ effectively concern the mobile terminal 120.

In a following step S513, the mobile terminal 120 obtains, from the time and frequency resources represented by the frequency hopping sequences $A_1, \ldots, A_N$, the transmission data of the K individual downlink transmissions that are transmitted via said time and frequency resources.

Then, in the step S514, the mobile terminal 120 filters the transmission data obtained in the step S513 by only keeping transmission data addressed to the mobile terminal 120. To do so, the mobile terminal 120 checks, for each time and frequency resources represented by the frequency hopping sequences $A_1, \ldots, A_N$, the information that is representative of the mobile terminal to which the downlink transmission concerned by said time and frequency resource is addressed and that has been included by the AP 110 in the step S503. Then, the mobile terminal 120 processes the kept transmission data, for instance by applying upper layer, e.g. applicative, mechanisms.

The algorithm of FIG. 5 allows reducing the quantity of signalling information as transmitted in e.g. the broadcast channel BCH. Another approach is to indicate, in the signalling information, to which one of the K individual transmission each time and frequency resource pointed by the applicable frequency hopping sequences is allocated.

FIG. 6 schematically represents an algorithm for determining time and frequency resources to be used for performing the K individual transmissions within the wireless communications network, by relying on a branch and bound approach. It means that a search tree is considered and that a per branch investigation is performed, said investigation being stopped when leading to a cumulative distance worst than a cumulative distance of a previously investigated branch. Let's consider that the algorithm of FIG. 6 is executed by the server 100.

In the scope of the algorithm of FIG. 6, a sliding window having a depth of N frames is considered. It is thus considered that the server 100 attempts determining the frequency hopping sequence $A_N$ for the N-th frame of the sliding window, while the frequency hopping sequences $A_1, \ldots, A_{N-1}$ have already been fixed. The server 100 has therefore to determine the individual sequences $T_1, \ldots, T_K$, while taking into account that the time and frequency resources allocations for the N−1 preceding frames are already fixed. If not statically defined, the server 100 further has to determine the appropriate frequency hopping sequence $A_N$ for the N-th frame of the sliding window. It is further considered that the server 100 attempts to minimize the aforementioned figure of merit $G'(A, T_1, \ldots, T_K)$.

In a step S601, the server 100 initialises variables that are local to the algorithm of FIG. 6. Consequently, a first variable BD is set to a value representative of infinity and a second variable k is set to "1". The first variable BD is representative of the best cumulative distance computed so far in the execution of the algorithm of FIG. 6. The second variable k is an index for parsing the considered K individual transmissions. The algorithm of FIG. 6 further uses a table CD of variables $CD[0], \ldots, CD[K]$. Each item $CD[k]$ of the table CD is representative of the cumulative distance computed in the iteration of the algorithm of FIG. 6 for the individual transmission k among the considered K individual transmissions. The server 100 sets the item CD[0] to "0", the item CD[0] being only useful for computation considerations and is not associated with any effective individual transmission among the K individual transmissions.

In a following step S602, the server 100 checks, for the current position in the search tree, whether another time and frequency resource shall be tested according to each allowable frequency hopping sequence for defining the frequency hopping sequence $A_N$. As already mentioned, the frequency hopping sequence $A_N$ may be statically defined, or may be dynamically defined although signalling does not allow representing each sequence made possible by the grid of time and frequency resources. When there is no more time and frequency resource to be tested according to each allowable frequency hopping sequence for the N-th frame, a step S609 is performed; otherwise, a step S603 is performed.

In the step S603, the server 100 selects a time and frequency resource to be tested and computes the value CD[k] as follows:

$$CD[k] = CD[k-1] - \log(1 - P_k(A', T'_k))$$

wherein $A' = [A_1, \ldots, A'_N]$, with $A'_N$ being the frequency hopping sequence for the N-th frame considered by the server 100 when selecting the time and frequency resource to be tested, and wherein $T'_k$ is the individual sequence for the transmission k among the K individual transmissions which is an aggregation of the time and frequency resources allocated to said transmission k in the N−1 preceding frames and of the selected time and frequency resource for the N-th frame.

In a following step S604, the server 100 checks whether the value CD[k] is greater than the value of the variable BD. When the value CD[k] is greater than the value of the variable BD, it means that the branch under investigation in the search tree doesn't lead to a better result than a previously investigated branch. When the value CD[k] is greater than the value of the variable BD, the step S602 is repeated by selecting, if any, another time and frequency resource that has not yet be tested; otherwise, a step S605 is performed.

In the step S605, the server 100 checks whether the variable k equals to K. When the variable k equals to K, all the K individual transmissions have been considered in the branch under investigation and a step S608 is performed; otherwise, a step S606 is performed.

In the step S606, the server 100 increments the variable k by one unit, thus going ahead with considering another transmission among the K individual transmissions. In other words, the server 100 continues investigating the branch currently under investigation by moving forward in the search tree with considering another transmission among the K individual transmissions, which defines a new current position in the search tree.

In an optional following step S607, the server 100 sorts the time and frequency resources that have to be investigated for the new current position in the search tree, according to each allowable frequency hopping sequence usable for defining the frequency hopping sequence $A_N$. The optional step S607 allows speeding up the execution of the algorithm of FIG. 6 by attempting investigating first the branch that would provide the better cumulative distance at the current position in the search tree. Then, the step S602 is repeated by selecting, if any, another time and frequency resource that has not yet been tested.

In the step S608, the server 100 stores the value CD[K] in the variable BD, which means that the branch currently under investigation leads to a better cumulative distance than any branch previously considered, and stores information representative of the time and frequency resources allocation for each one of the K individual transmissions that led to such a cumulative distance CD[K]. Then, the step S602 is repeated by selecting, if any, another time and frequency resource that has not yet been tested.

In the step S609, the server 100 decrements the variable k by one unit, thus going backward with reconsidering the preceding individual transmission among the K individual transmissions. In other words, the server 100 continues investigating the branch currently under investigation by moving backward in the search tree with reconsidering the individual transmission, among the K individual transmissions, considered in the preceding iteration.

In a following step S610, the server 100 checks whether the variable k equals to "0". When the variable k equals to "0", it means that no other branch of the search tree needs to be investigated and the algorithm ends in a step S611; otherwise, the step S602 is repeated by selecting, if any, another time and frequency resource that has not yet been investigated, which provides a new current position in the search tree (which indeed corresponds to a position that has already been, at least partially, investigated).

As an investigation of a branch is stopped when said investigation leads to a worst cumulative distance than another branch previously investigated, determining the appropriate allocation of time and frequency resources to perform the K individual transmissions takes less time compared with an exhaustive analysis of all possible individual sequences $T_1, \ldots, T_K$ in view of each frequency hopping sequence allowable for the considered frame N.

The algorithm of FIG. 6 may be prematurely interrupted, for instance when a maximum execution time period is defined in order to ensure that the execution of the algorithm of FIG. 6 provides a result within said maximum execution time period. When the algorithm of FIG. 6 is prematurely interrupted, the time and frequency resources allocation that led to the cumulative distance stored in the variable BD is considered as the allocation to be effectively performed.

The algorithm of FIG. 6 may be adapted to implement a search tree approach for allocating time and frequency resources over a cycle of N frames. The server 100 then determines the individual sequences $T_1, \ldots, T_K$ and potentially the frequency hopping sequences $A_1, \ldots, A_N$ without taking into account what time and frequency resources have been allocated in a preceding cycle. In this case the course of the index k is expected to range from 1 to N*K, the values k mod [N] (mod being the modulus operator) of the index k being associated to a same individual transmission, and, in the step S605, the index k is compared with N*K.

FIG. 7 schematically represents an algorithm for determining time and frequency resources to be used for performing transmissions within the wireless communications network, by relying on a one-shot decision for each time resource in an N-th frame in a sliding window of N successive frames. Let's consider that the algorithm of FIG. 7 is executed by the server 100.

It is considered in the scope of the algorithm of FIG. 7 that the probability for one individual transmission among the K individual transmissions to stop is identical from one time resource to another in the N-th frame. It means that, once a suitable frequency resource is found for one individual transmission among the K individual transmissions, any time resource of the N-th frame can be used to perform said individual transmission.

In a step S701, the server 100 sets a variable k to "1". The variable k is used as an index for parsing the considered K individual transmissions.

In a following step S702, the server 100 computes partial figures of merit G" for all possible frequency resources for the individual transmission k among the K individual transmissions. The partial figures of merit are defined as follows:

$$G''(k, F_m) = (1 - P_k(F_m))$$

wherein $F_m$ represents the considered frequency resource and $P_k(F_m)$ represents the probability that the individual transmission k stops due to interference and/or noise and/or path loss, when using the frequency resource $F_m$.

In a following step S703, the server 100 selects the frequency resource $F_m$ showing the best partial figure of merit G" for the individual transmission k.

In a following step S704, the server 100 sorts the frequency resources $F_m$ according to a criteria relating to the computed partial figures of merit G". Preferably, the server 100 sorts the frequency resources $F_m$ in decreasing order of the computed partial figures of merit G". The server 100 then stores the sorted frequency resources $F_m$ in association with their respective computed partial figures of merit G" for the individual transmission k.

In a following step S705, the server 100 checks whether the variable k equals to K. When the variable k equals to K, which means that all the K individual transmissions have been considered, a step S707 is performed; otherwise, a step S706 is performed.

In the step S706, the server 100 increments the variable k by one unit and the step S702 is repeated.

The part of the algorithm of FIG. 7 that runs from the step S701 to the input of the step S707 is referenced S700. This reference is of low interest in the scope of FIG. 7, but is reused in the scope of the algorithm of FIG. 8, as detailed hereafter.

In the step S707, the server 100 sorts the K individual transmissions in increasing order of the partial figures of merit G" corresponding to their respective selected frequency resources $F_m$. The server 100 thus obtains a list of sorted individual transmissions. In the following, the server 100 investigates time and frequency resources allocation by considering the K individual transmissions from the individual transmission showing the worst partial figure of merit G" to the individual transmission showing the best partial figure of merit G".

In a following step S708, the server 100 selects the individual transmission appearing first among the K individual transmissions as sorted in the step S707.

In a following step S708, the server 100 determines a list of frequency hopping sequences in the alphabet that match the selected frequency resource $F_m$ for the individual transmission selected in the step S708. To do so, the server 100 starts filtering the alphabet by retaining each frequency hopping sequence in the alphabet which matches the frequency resource $F_m$ for the individual transmission selected in the step S708, as well as each frequency resource $F_m$ that has been selected for each individual transmission that has already been considered in a previous iteration, if any, of the step S709. The retained frequency hopping sequences form a list of filtered frequency hopping sequences matching each frequency resource $F_m$ that has been selected for each individual transmission that has already been considered in the current iteration or in a previous iteration of the step S709.

When the server 100 detects, in a step S710, that the list of filtered frequency hopping sequences becomes empty, the server 100 reiterates the preceding filtering step by selecting, in a step S711, for the individual transmission selected in the step S708, the frequency resource $F_m$ appearing next among the frequency resources $F_m$ as sorted in the step S704 for said individual transmission. Then, the step S709 is repeated. Otherwise, when the server 100 detects in the step S710 that the list of filtered frequency hopping sequences is not empty, a step S712 is performed.

In the step S712, the server 100 checks whether all the K individual transmissions have been considered. When at least one individual transmission remains to be considered, the step S708 is repeated by selecting the individual transmission appearing next among the K individual transmissions as sorted in the S707; otherwise, a step S713 is performed.

In the step S713, all the K individual transmissions have been considered. The list of filtered frequency hopping sequences should contain at least one frequency hopping sequence that would allow performing the K individual transmissions for what concerns the N-th frame in the sliding window. In the step S713, the server 100 selects, e.g. arbitrarily, one frequency hopping sequence in the list of filtered frequency hopping sequence. The selected frequency hopping sequence would be the frequency hopping sequence $A_N$ to be applied for the N-th frame in the sliding window.

In a following step S714, the server 100 allocates one time and frequency resource of the frequency hopping sequence $A_N$ to each one of the K individual transmissions, such that the time and frequency resource allocated to each one of the K individual transmissions matches the frequency resource $F_m$ selected for said individual transmission in the step S703 or in the step S711.

The algorithm of FIG. 7 proposes a simple method to determine the frequency hopping sequence $A_N$ and allocate the time and frequency resources thereof to the K individual transmissions. The overall robustness of the K individual transmissions may further be improved. Indeed, as the sorting of the K individual transmissions performed in the step S707 is not modified afterwards, this may result in degraded transmission conditions for the last considered individual transmissions among the K individual transmissions. An improved method is hence provided hereafter with regard to FIG. 8.

FIG. 8 schematically represents an algorithm for determining time and frequency resources to be used for performing transmissions within the wireless communications network, by relying on an iterative decision for each time resource in an N-th frame in a sliding window of N successive frames. Let's consider that the algorithm of FIG. 8 is executed by the server 100.

It is considered in the scope of the algorithm of FIG. 8 that the probability for one individual transmission among the K individual transmissions to stop is identical from one time resource to another in the N-th frame. It means that, once a suitable frequency resource is found for one individual transmission among the K individual transmissions, any time resource of the N-th frame can be used to perform said individual transmission.

In a step S800, the server 100 sets a variable C to "0". The variable C is used to detect when the K individual transmissions need to be sorted again, as detailed hereafter.

Then, the server 100 performs the step S700, as already detailed with regard to FIG. 7.

In a following step S801, the server 100 sorts the K individual transmissions in increasing order of the partial figures of merit G" corresponding to their respective selected frequency resources $F_m$. The server 100 thus obtains a list of sorted individual transmissions. In the following, the server 100 investigates time and frequency resources allocation by considering the K individual transmissions from the individual transmission showing the worst partial figure of merit G" to the individual transmission showing the best partial figure of merit G".

In a following step S802, the server 100 selects the individual transmission appearing first among the K individual transmissions as sorted in the step S801.

In a following step S803, the server 100 determines a list of frequency hopping sequences in the alphabet that match the frequency resource $F_m$ for the individual transmission selected in the step S802. To do so, the server 100 starts filtering the alphabet by retaining each frequency hopping sequence in the alphabet which matches the frequency resource $F_m$ for the individual transmission selected in the step S802, as well as each frequency resource $F_m$ that has been selected for each individual transmission that has already been considered in a previous iteration, if any, of the step S803 since the last preceding execution of the step S801. The retained frequency hopping sequences form a list of filtered frequency hopping sequences matching each frequency resource $F_m$ that has been selected for each individual transmission that has already been considered in the current iteration or in a previous iteration of the step S803 (since the last preceding execution of the step S801).

When the server 100 detects, in a step S804, that the list of filtered frequency hopping sequences becomes empty, the server 100 reiterates the preceding filtering step by selecting, in a step S805, for the individual transmission selected in the step S802, the frequency resource $F_m$ appearing next among the frequency resources $F_m$ as sorted in the step S700 for said individual transmission. The server 100 further sets the variable C to "1". Then, the step S803 is repeated. Otherwise, when the server 100 detects in the step S804 that the list of filtered frequency hopping sequences is not empty, a step S806 is performed.

In the step S806, the server 100 checks whether all the K individual transmissions have been considered. When at least one individual transmission remains to be considered, the step S802 is repeated by selecting the individual transmission appearing next among the K individual transmissions as sorted in the S801; otherwise, a step S807 is performed.

In the step S807, all the K individual transmissions have been considered. The list of filtered frequency hopping sequences should contain at least one frequency hopping sequence that would allow performing the K individual transmissions for what concerns the N-th frame in the sliding window. In the step S807, the server 100 selects one frequency hopping sequence $A'_N$ in the list of filtered frequency hopping sequences.

In a following step S808, the server 100 tests an allocation of one time and frequency resource of the frequency hopping sequence selected in the step S807 to each one of the K individual transmissions, such that the time and frequency resource allocated to each one of the K individual transmissions matches the frequency resource $F_m$ selected for said individual transmission in the step S700 or in the step S805. The server 100 testing such an allocation means that the server 100 acts as if the server 100 were effectively allocating the time and frequency resources, although the server 100 only investigates what would be a result of such an allocation.

In a following step S809, the server 100 computes a global figure of merit according to the frequency hopping sequences $A_1, \ldots, A'_N$, and according to the individual sequences $T_1, \ldots, T_K$. The definition of the frequency hopping sequence $A'_N$ and of the individual sequences $T_1, \ldots, T_K$ result from the time and frequency resources allocations performed for the K individual transmissions over the N−1 preceding frames and from the allocation the time and frequency resources allocation tested in the step S808. The global figure of merit is for instance defined identically as the aforementioned figure of merit G'. The server 100 retains in memory the computed global figure of merit, as well as the tested allocation of time and frequency resources.

In a following step S810, the server 100 checks whether all the frequency hopping sequences present in the list of filtered frequency hopping sequences have been considered. When at least one frequency hopping sequence remains to be considered, the step S807 is repeated by selecting one frequency hopping sequence from the list of filtered frequency hopping sequences which has not yet been considered; otherwise, a step S811 is performed.

In the step S811, the server 100 checks whether the variable C equals to "0". When the variable C equals to "0", a step S811 is performed; otherwise, a step S813 is performed.

In the step S813, the server 100 sets the variable C to "0" and repeats the step S801 as follows. The server 100 however sorts the K individual transmissions according to the time and frequency resources $F_m$ as modified after execution of the step S805. The server 100 then retrieves the time and frequency resources $F_m$ showing the best partial figure of merit G" for each one of the K individual transmissions. The server 100 then selects, for each one of the K individual transmissions, said time and frequency resources $F_m$, as performed in the step S703. Another iteration is thus performed with the selected time and frequency resources $F_m$, except that the K individual transmissions are sorted differently.

In the step S812, the server 100 selects the frequency hopping sequence $A'_N$ (that then becomes the frequency hopping sequence $A_N$) and the individual sequences $T_1, \ldots, T_K$ showing the best global figure of merit according to a predefined criteria. The server 100 then allocates the corresponding time and frequency resources to the K individual transmissions.

FIG. 9 schematically represents an algorithm for determining time and frequency resources to be used for performing transmissions within the wireless communications network, by relying on a genetic approach. The algorithm of FIG. 9 aims at determining the time and frequency resources to be used for performing the K individual transmissions in the N-th frame of a sliding window of N successive frames. Let's consider that the algorithm of FIG. 9 is executed by the server 100.

In a step S901, the server 100 obtains frequency hopping sequences $[A_1, \ldots, A_N]=A$ and a set of individual sequences $T_1, \ldots, T_K$, for the respective K individual transmissions, over N successive frames on which the respective frequency hopping sequences $A_1, \ldots, A_N$ apply. The frequency hopping sequences $A_1, \ldots, A_{N-1}$ result from the time and frequency resources allocation for the N−1 preceding frames. Similarly, the time and frequency resources of the individual sequences $T_1, \ldots, T_K$ for said N−1 preceding frames result from the time and frequency resources allocation for the N−1 preceding frames. In the step S901, the server 100 complements the definition of the frequency hopping sequences and of the individual sequences $T_1, \ldots, T_K$ by time and frequency resources for the N-th frame of the sliding window. The server 100 further marks the time and frequency resources of the N-th frame which led to the individual sequences $T_1, \ldots, T_K$.

In one embodiment, said time and frequency resources for the N-th frame are, in the step S901, arbitrarily selected by the server 100, while ensuring that the frequency hopping sequence $A_N$ corresponds to an allowable frequency hopping sequence, e.g. one frequency hopping sequence of the alphabet.

In another embodiment, said time and frequency resources for the N-th frame are, in the step S901, obtained by the server 100 by execution of the algorithm of FIG. 7, or of the algorithm of FIG. 8, or of after having prematurely interrupted the algorithm of FIG. 6.

In a following step S902, the server 100 computes partial figures of merit G° for the K individual transmissions, as follows:

$$G°(k, TS_m, F_m) = (1 - P_k(TS_m, F_m))$$

wherein $F_m$ represents the frequency resource that has been attributed to the individual transmission k for the N-th frame in the step S901, $TS_m$ represents the time resource that has been attributed to the individual transmission k for the N-th frame in the step S901 (the couple $(TS_m, F_m)$ therefore representing the time and frequency resource that has been attributed to the individual transmission k for the N-th frame in the step S901) and $P_k(TS_m, F_m)$ represents the probability that the individual transmission k stops due to interference and/or noise and/or path loss, when using the time and frequency resource $(TS_m, F_m)$.

In a following step S903, the server 100 computes a global figure of merit according to the frequency hopping sequences $A_1, \ldots, A_N$ and according to the individual sequences $T_1, \ldots, T_K$. The global figure of merit is for instance defined identically as the aforementioned figure of merit G'. The server 100 retains in memory the computed global figure of merit, as well as the corresponding allocation of time and frequency resources.

In a following step S904, the server 100 selects the individual transmission having the worst partial figure of merit as computed in the step S903.

In a following step S905, the server 100 determines possible permutations, according to the frequency hopping sequence $A_N$, between the time and frequency resource attributed to the selected individual transmission and another time and frequency resource attributed to another individual transmission in the N-th frame.

In a following step S906, the server 100 determines, for each possible permutation, the global figure of merit according to the frequency hopping sequences $A_1, \ldots, A_N$, and to the individual sequences $T_1, \ldots, T_K$, as resulting from said permutation.

In a following step S907, the server 100 determines whether any global figure of merit determined in the step S906 is better than the global figure of merit computed in the step S902 according to a predefined criteria. When this is the case, a step S908 is performed; otherwise, a step S909 is performed.

In the step S908, the server 100 unmarks the time and frequency resources of the N-th frame and marks the time and frequency resources of the frame N which led to the best global figure of merit. Then the step S909 is performed.

In the step S909, the server 100 checks whether a first predefined time period TP1 elapsed since the execution of the step S901 or since the last execution of the step S909. The first predefined time period TP1 is a time period dedicated to performing permutations on the basis of one frequency hopping sequence $A_N$. Once the first predefined time period TP1 has elapsed, the server 100 is expected to switch to another frequency hopping sequence $A_N$ for checking whether a better global figure of merit may be reached by permutations. Once the first predefined time period TP1 has elapsed, a step S910 is performed; otherwise, the step S904 is repeated.

In the step S910, the server 100 checks whether a second predefined time period TP2 elapsed since the execution of the step S901 or since the last execution of the step S910. The second predefined time period TP2 is a time period dedicated to performing permutations on the basis of any frequency hopping sequence $A_N$, i.e. time period dedicated to the execution of the algorithm of FIG. 9. Once the second predefined time period TP2 has elapsed, a step S912 is performed; otherwise, a step S911 is performed.

In the step S911, the server 100 selects another frequency hopping sequence $A_N$, if any more allowable frequency hopping sequence $A_N$ is available, for checking whether a better global figure of merit may be reached by permutations.

In the step S912, the server 100 selects the frequency hopping sequence $A_N$ and the individual sequences $T_1, \ldots, T_K$ which correspond to the time and frequency resources that have been marked during the various executions of the step S907.

FIG. 10 schematically represents an algorithm for allocating time and frequency resources to be used for performing transmissions within the wireless communications network, when signalling of frequency hopping sequences imposes having consecutive time resources used in conjunction with a same frequency resource. The algorithm of FIG. 10 aims at providing an alternative implementation of the step S720. Let's consider that the algorithm of FIG. 10 is executed by the server 100.

It is considered in the scope of the algorithm of FIG. 10 that the signalling information imposes having consecutive time resources used in conjunction with a same frequency resource. According to an example, for sixteen frequency resources, four bits are typically needed to indicate for each time resource which frequency resource is allocated. In this example, eighty bits are therefore needed for signalling allocation of a frame of twenty time resources. The quantity of signalling information may be reduced by considering using a same frequency resource for plural consecutive time resources. In the example above, by considering blocks of four consecutive time resources, only twenty bits are needed to represent the signalling information. Among each block of consecutive time resources, each time resource is intended to be allocated to distinct individual transmissions, which means that plural individual transmissions are supposed to use the same frequency resource in a same frame.

In a step S1001, the server 100 initialises a frequency assignment vector FAV with all dimensions set to "0". The frequency assignment vector FAV is intended to indicate, for each block of consecutive time resources, what frequency resource is associated with. The quantity of dimensions of the frequency assignment vector FAV equals to the quantity of blocks in each frame, as defined by the format of the signalling information.

In the step S1001, the server 100 initialises a transmission assignment counter TAC with all dimensions set to "0". The transmission assignment counter TAC is intended to indicate, for each block of consecutive time resources, how many individual transmissions among the K individual transmissions are assigned to the frequency resource associated with said block. The quantity of dimensions of the transmission assignment counter TAC equals to the quantity of blocks in each frame, as defined by the format of the signalling information.

In a following step S1002, the server 100 selects the individual transmission appearing first in the list of sorted individual transmissions, as obtained by execution of the step S707.

In a following step S1003, the server 100 obtains the frequency resource that has been selected beforehand for the individual transmission selected in the step S1002. Let's denote F° the selected frequency resource. The frequency resource F° has been selected by the server 100 in the step S703, and might have been modified in a step S1007 detailed hereafter.

In a following step S1004, the server 100 checks whether there exists a block i such that FAV[i] equals to the frequency resource F°. When there exists a variable i such that FAV[i] equals to the frequency resource F°, it means that the frequency resource F° has been already assigned to a block of consecutive time resources, and then a step S1005 is performed; otherwise, a step S1006 is performed.

In the step S1005, the server 100 checks whether TAC[i] equals to the maximum quantity of individual transmissions that the block i can accept according to the format of the signalling information. When TAC[i] equals to the maximum quantity of individual transmissions that the block i can accept, the step S1006 is performed; otherwise, a step S1009 is performed.

In the step S1006, the server 100 checks whether there exists a block i such that FAV[i] equals to "0". When there exists a block i such that FAV[i] equals to "0", it means that at least one block of consecutive time resources has not yet been assigned a frequency resource, then a step S1008 is performed; otherwise, the step S1007 is performed.

In the step S1007, the server 100 selects, for the considered individual transmission, the frequency resource appearing next among the frequency resources as sorted in the step S704 for the considered individual transmission. Said frequency resource becomes the frequency resource F°. Then, the step S1004 is repeated by considering the frequency resource F° selected in the step S1007.

In the step S1008, the server 100 assigns the selected frequency resource F° to the block i by assigning the selected frequency resource F° to FAV[i]. Then the step S1009 is performed.

In the step S1009, the server 100 increments TAC[i] by one unit.

In a following step S1010, the server 100 checks whether there is at least one other individual transmission among the K individual transmissions which has not yet been considered. When there is at least one other individual transmission to be considered, the step S1002 is repeated by selecting the individual transmission appearing next in the sorted list of the K individual transmissions, as obtained in the step S707; otherwise, a step S1011 is performed.

In the step S1011, the server 100 defines a frequency hopping sequence $A_N$ to be applied onto the N-th frame of the sliding window, according to the frequency assignment vector FAV. Then the server 100 is intended to perform the step S712, in which the server 100 allocates one time and frequency resource of the frequency hopping sequence $A_N$ to each one of the K individual transmissions, such that the time and frequency resource allocated to each one of the K individual transmissions matches the frequency resource F° selected for said individual transmission in the step S703 or in the step S1007.

The invention claimed is:

1. A method for determining time and frequency resources from amongst time and frequency resources of a wireless communications network to be used for performing K individual transmissions over N successive frames in said wireless communications network, the time and frequency resources to be used for performing the K individual transmissions defining respective individual sequences $T_1, \ldots, T_K$ over the N successive frames, one time and frequency resource having to be allocated to one of the K individual transmissions per frame, wherein the time and frequency resources of the wireless communications network are represented by a grid with time resources on one dimension and frequency resources on another dimension, the grid defining possible time and frequency resources sequences such that one transmission among the K individual transmissions being allowed per time resource, wherein the method is performed by a managing device in charge of allocating time and frequency resources to perform transmissions within the wireless communications network, the method comprising:

computing a figure of merit $G(A, T_1, \ldots, T_K)$ for each possible set of the individual sequences $T_1, \ldots, T_K$ over the N successive frames on which respective frequency hopping sequences $[A_1, \ldots, A_N]=A$ apply, the figure of merit $G(A, T_1, \ldots, T_K)$ being representative of transmission robustness to interference and/or noise and/or path loss, and being determined under a constraint such that the frequency hopping sequences $A_1, \ldots, A_N$ are defined among a predefined set of allowable frequency hopping sequences which is a subset of all the time and frequency resources sequences made possible by said grid;

selecting the set of individual sequences $T_1, \ldots, T_K$ showing the best figure of merit $G(A, T_1, \ldots, T_K)$ according to a predefined criteria relative to the computed figures of merit $G(A, T_1, \ldots, T_K)$;

dynamically defining the frequency hopping sequences $A_1, \ldots, A_N$ jointly with the set of individual sequences $T_1, \ldots, T_K$; and determining signalling information intended to be broadcasted in the wireless communications network to provide information representative of each frequency hopping sequence $A_1, \ldots, A_N$ to be applied to the respective N successive frames, said signalling information consisting of a code in a codebook representing an alphabet of said predefined set of allowable frequency hopping sequences, the alphabet having a size limited by a maximum size of the signalling information.

2. The method according to claim 1, wherein the figure of merit $G(A, T_1, \ldots, T_K)$ is representative of a probability of occurrence of any individual transmission stop and is defined as follows:

$$G(A, T_1, \ldots, T_K) = \sum_{k=1}^{K} -\log(1 - P_k(A, T_k))$$

wherein k is an index for parsing the K individual transmissions, $P_k$ is a probability that the individual transmission designated by the index k stops in view of the frequency hopping sequences $A_1, \ldots, A_N$ and of the set of individual sequences $T_1, \ldots, T_K$;

and in that the managing device selects the set of individual sequences $T_1, \ldots, T_K$ minimizing the figure of merit $G(A, T_1, \ldots, T_K)$.

3. The method according to claim 2, wherein, allocating time and frequency resources being performed thanks to a search tree approach on the basis of a sliding window having a size equal to N frames, said method relies on a per branch investigation comprising:

selecting a time and frequency resource of the N-th frame of the sliding window for one individual transmission k among the K individual transmissions, according to said predefined set of allowable frequency hopping sequences, wherein selecting said time and frequency resource corresponds to a branch of the search tree;

computing a cumulative distance CD[k] as follows:

$$CD[k]=CD[k-1]-\log(1-P_k(A',T'_k))$$

wherein $k=1, \ldots, K$ is an index for parsing the K individual transmissions, CD[0] is null, and wherein $A'=[A_1, \ldots, A'_N]$, with $A'_N$ being the frequency hopping sequence for the N-th frame considered when selecting the time and frequency resource to be tested, and wherein $T'_k$ is the individual sequence for the individual transmission k which is an aggregation of the time and frequency resources allocated to said individual transmission k in the N−1 first frames of the sliding window and of the selected time and frequency resource for the N-th frame of the sliding window;

and in that the method further comprises:

moving forward in the investigation of the branch by considering the individual transmission represented by the index k+1 when the computed cumulative distance CD[k] is lower than, or equals to, a best cumulative distance BD computed during a preceding investigation of another branch in which all K individual transmissions have been considered; and starting investigating another branch when the computed cumulative distance CD[k] is greater than the best cumulative distance BD.

4. The method according to claim 3, wherein, when the search tree approach is prematurely interrupted, the frequency hopping sequence $A_N$ is defined as the frequency hopping sequence $A'_N$ corresponding to the best cumulative distance BD computed so far and the individual sequences $T_1, \ldots, T_K$ are defined as the individual sequences $T'_1, \ldots, T'_K$ also corresponding to the best cumulative distance BD computed so far.

5. The method according to claim 2, wherein, the probability for one individual transmission among the K individual transmissions to stop is identical from one time resource to another in the N-th frame of a sliding window having a size equal to N frames, said method comprises:

computing, for each individual transmission k among the K individual transmissions, a partial figure of merit G" for all possible frequency resources, the partial figure of merit G" being defined as follows:

$$G"(k,F_m)=(1-P_k(F_m))$$

wherein $F_m$ represents a considered frequency resource and $P_k(F_m)$ represents a probability that the individual transmission k stops when using the frequency resource $F_m$;

sorting, for each individual transmission k among the K individual transmissions, the frequency resources in increasing order of the partial figures of merit G";

selecting, for each individual transmission k among the K individual transmissions, the frequency resource $F_m$ appearing first among the sorted frequency resources;

and, for each individual transmission k, the K individual transmissions being considered in decreasing order of the partial figures of merit G" respectively associated with the frequency resources $F_m$ selected for the K individual transmissions:

determining a list of allowable frequency hopping sequences such that said allowable frequency hopping sequences match the frequency resources $F_m$ selected for the K individual transmissions, and when the list becomes empty, selecting the frequency resource $F_m$ appearing next among the sorted frequency resources $F_m$ for the individual transmission k;

and in that the method further comprises:

selecting an allowable frequency hopping sequence from said list of allowable frequency hopping sequences, the selected allowable frequency hopping sequence then being the frequency hopping sequence $A_N$ to be applied to the N-th frame of the sliding window; and allocating time resources to the K individual transmissions, according to the selected allowable frequency hopping sequence.

6. The method according to claim 2, wherein, the probability for one individual transmission among the K individual transmissions to stop is identical from one time resource to another in the N-th frame of a sliding window having a size equal to N frames, said method comprises:

computing, for each individual transmission k among the K individual transmissions, a partial figure of merit G" for all possible frequency resources, the partial figure of merit G" being defined as follows:

$$G''(k, F_m) = (1 - P_k(F_m))$$

wherein $F_m$ represents a considered frequency resource and $P_k(F_m)$ represents a probability that the individual transmission k stops when using the frequency resource $F_m$;

sorting, for each individual transmission k among the K individual transmissions, the frequency resources in increasing order of the partial figures of merit G", in order to obtain for each individual transmission k an initial sorted list of the frequency resources;

selecting, for each individual transmission k among the K individual transmissions, the frequency resource $F_m$ appearing first among the sorted frequency resources;

sorting the K individual transmissions in decreasing order of the partial figures of merit G" respectively associated with the frequency resources $F_m$ selected for the K individual transmissions;

and, for each individual transmission k, a processing phase of:

determining a list of allowable frequency hopping sequences such that said allowable frequency hopping sequences match the frequency resources $F_m$ selected for the K individual transmissions, and when the list becomes empty, modifying the selected frequency resource $F_m$ for the individual transmission k by selecting the frequency resource $F_m$ appearing next among the sorted frequency resources $F_m$ for the individual transmission k;

determining the figure of merit $G(A, T_1, \ldots, T_K)$ for each allowable frequency hopping sequence in the list of allowable frequency hopping sequences;

and, when the selected frequency resource $F_m$ has been modified for at least one individual transmission:

re-sorting the K individual transmissions in decreasing order of the partial figures of merit G" respectively associated with the frequency resources $F_m$ selected, or modified when applicable, for the K individual transmissions, in order to obtain a re-sorted list of the K individual transmissions;

reiterating the processing phase on the basis of the initial sorted list of the frequency resources and on the basis of the re-sorted list of the K individual transmissions;

and in that the method further comprises:

selecting the allowable frequency hopping sequence from said list of allowable frequency hopping sequences which shows the best figure of merit $G(A, T_1, \ldots, T_K)$, the selected allowable frequency hopping sequence then being the frequency hopping sequence $A_N$ to be applied to the N-th frame of the sliding window; and allocating time resources to the K individual transmissions, according to the selected allowable frequency hopping sequence.

7. The method according to claim 2, wherein the signalling information imposes having blocks of consecutive time resources used in conjunction with a same frequency resource, the probability for one individual transmission among the K individual transmissions to stop is identical from one time resource to another in the N-th frame of a sliding window having a size equal to N frames, wherein a frequency assignment vector FAV is intended to indicate, for each block of consecutive time resources, what frequency resource is associated with, the frequency assignment vector FAV having a quantity of dimensions equal to the quantity of blocks in each frame;

wherein a transmission assignment counter TAC intended to indicate, for each block of consecutive time resources, how many individual transmissions among the K individual transmissions are assigned to the frequency resource associated with said block, the transmission assignment counter TAC having a quantity of dimensions equal to the quantity of blocks in each frame;

and in that said method comprises:

computing, for each individual transmission k among the K individual transmissions, a partial figure of merit G" for all possible frequency resources, the partial figure of merit G" being defined as follows:

$$G''(k, F_m) = (1 - P_k(F_m))$$

wherein $F_m$ represents a considered frequency resource and $P_k(F_m)$ represents a probability that the individual transmission k stops when using the frequency resource $F_m$;

sorting, for each individual transmission k among the K individual transmissions, the frequency resources in increasing order of the partial figures of merit G";

selecting, for each individual transmission k among the K individual transmissions, the frequency resource $F_m$ appearing first among the sorted frequency resources;

sorting the K individual transmissions in decreasing order of the partial figures of merit G" respectively associated with the frequency resources $F_m$ selected for the K individual transmissions;

and, for each individual transmission k, a processing phase of:

checking whether there exists a block i such that FAV[i] equals to the frequency resource $F_m$ selected for the individual transmission k;

incrementing by one unit TAC[i], when there exists such a block i and when TAC[i] has not reached a maximum quantity of time resources in the block i;

and, when such a block i doesn't exist, or when such a block i exists and TAC[i] has reached the maximum quantity of time resources in the block i:

checking whether there exists a block j such that FAV[j] is null;

assigning the frequency resource $F_m$ selected for the individual transmission k to the block j by assigning said frequency resource $F_m$ to FAV[j] and incrementing by one unit TAC[j], when there exists such a block j;

selecting the frequency resource $F_m$ appearing next among the sorted frequency resources $F_m$ for the individual transmission k, when such a block j doesn't exist and reiterating the processing phase for said individual transmission k;

and in that the method further comprises:

allocating the frequency hopping sequence $A_N$ for the N-th frame of the sliding window and the individual sequences $T_1, \ldots T_K$ which correspond to the frequency assignment vector FAV.

8. The method according to claim 2, wherein, considering the N-th frame of a sliding window having a size equal to N frames, said method comprises:

obtaining initial frequency hopping sequences $[A_1, \ldots, A_{N-1}, A'_N] = A'$ and a set of initial individual sequences $T'_1, \ldots, T'_K$, for the respective K individual transmissions, over the sliding window, wherein the initial frequency hopping sequences $A_1, \ldots, A_{N-1}$ result from time and frequency resources allocation for the N−1 first frames of the sliding window and wherein the time and frequency resources of the individual sequences $T'_1, \ldots, T'_K$ for the N−1 first frames of the sliding window result from the time and frequency resources allocation for said N−1 first frames;

computing a partial figure of merit $G°$ for each individual transmission k of the K individual transmissions, as follows:

$$G°(k, TS_m, F_m) = (1 - P_k(TS_m, F_m))$$

wherein $F_m$ represents the frequency resource that has been attributed to the individual transmission k for the N-th frame in the initial individual sequences $T'_k$, $TS_m$ represents the time resource that has been attributed to the individual transmission k for the N-th frame in the initial individual sequences $T'_k$ and $P_k(TS_m, F_m)$ represents a probability that the individual transmission k stops when using the time and frequency resource $(TS_m, F_m)$;

determining the figure of merit $G(A', T'_1, \ldots, T'_K)$ according to the initial frequency hopping sequences $[A_1, \ldots, A_{N-1}, A'_N] = A'$ and the set of initial individual sequences $T'_1, \ldots, T'_K$;

and, for each individual transmission k among the K individual transmissions, considered for each allowable frequency hopping sequence for the N-th frame of the sliding window, in decreasing order of the partial figures of merit $G°$:

determining possible permutations, according to the frequency hopping sequence $A'_N$, between the time and frequency resource attributed to the selected individual transmission for the N-th frame in the initial individual sequences $T'_k$ and another time and frequency resource attributed to another individual transmission for the N-th frame;

determining the figure of merit G for each determined possible permutation;

and in that the method further comprises, once a predefined time period has elapsed:

allocating the frequency hopping sequence $A_N$ for the N-th frame of the sliding window and the individual sequences $T_1, \ldots, T_K$ which led to the best figure of merit G according to said predefined criteria.

9. The method according to claim 1, wherein the figure of merit $G(A, T_1, \ldots, T_K)$ is representative of a probability of non-occurrence of any individual transmission stop and is defined as follows:

$$G(A, T_1, \ldots, T_K) = \prod_{k=1}^{K} (1 - P_k(A, T_k))$$

wherein k is an index for parsing the K individual transmissions, $P_k$ is a probability that the individual transmission designated by the index k stops in view of the frequency hopping sequences $A_1, \ldots, A_N$ and of the set of individual sequences $T_1, \ldots, T_K$;

and in that the managing device selects the set of individual sequences $T_1, \ldots, T_K$ maximizing the figure of merit $G(A, T_1, \ldots, T_K)$.

10. A method for determining time and frequency resources from amongst time and frequency resources of a wireless communications network to be used for performing K individual transmissions over N successive frames in said wireless communications network, the time and frequency resources to be used for performing the K individual transmissions defining respective individual sequences $T_1, \ldots, T_K$ over the N successive frames, one time and frequency resource having to be allocated to one of the K individual transmissions per frame, wherein the time and frequency resources of the wireless communications network are represented by a grid with time resources on one dimension and frequency resources on another dimension, the grid defining possible time and frequency resources sequences such that one transmission among the K individual transmissions being allowed per time resource, wherein the method is performed by a managing device in charge of allocating time and frequency resources to perform transmissions within the wireless communications network, the method comprising:

computing a figure of merit $G(A, T_1, \ldots, T_K)$ for each possible set of the individual sequences $T_1, \ldots, T_K$ over the N successive frames on which respective frequency hopping sequences $[A_1, \ldots, A_N] = A$ apply, the figure of merit $G(A, T_1, \ldots, T_K)$ being representative of transmission robustness to interference and/or noise and/or path loss, and being determined under a constraint such that the frequency hopping sequences $A_1, \ldots, A_N$ are defined among a predefined set of allowable frequency hopping sequences which is a subset of all the time and frequency resources sequences made possible by said grid;

selecting the set of individual sequences $T_1, \ldots, T_K$ showing the best figure of merit $G(A, T_1, \ldots, T_K)$ according to a predefined criteria relative to the computed figures of merit $G(A, T_1, \ldots, T_K)$;

wherein the figure of merit $G(A, T_1, \ldots, T_K)$ is representative of a probability of non-occurrence of any individual transmission stop and is defined as follows:

$$G(A, T_1, \ldots, T_K) = \prod_{k=1}^{K} (1 - P_k(A, T_k))$$

wherein k is an index for parsing the K individual transmissions, $P_k$ is a probability that the individual transmission designated by the index k stops in view of the frequency hopping sequences $A_1, \ldots, A_N$ and of the set of individual sequences $T_1, \ldots, T_K$;

and in that the managing device selects the set of individual sequences $T_1, \ldots, T_K$ maximizing the figure of merit $G(A, T_1, \ldots, T_K)$.

11. A method for determining time and frequency resources from amongst time and frequency resources of a wireless communications network to be used for performing K individual transmissions over N successive frames in said wireless communications network, the time and frequency resources to be used for performing the K individual transmissions defining respective individual sequences $T_1, \ldots, T_K$ over the N successive frames, one time and frequency resource having to be allocated to one of the K individual transmissions per frame, wherein the time and frequency resources of the wireless communications network are represented by a grid with time resources on one dimension and frequency resources on another dimension, the grid defining possible time and frequency resources sequences such that one transmission among the K individual transmissions being allowed per time resource, wherein the method is performed by a managing device in charge of allocating time and frequency resources to perform transmissions within the wireless communications network, the method comprising:

computing a figure of merit $G(A, T_1, \ldots, T_K)$ for each possible set of the individual sequences $T_1, \ldots, T_K$ over the N successive frames on which respective frequency hopping sequences $[A_1, \ldots, A_N]=A$ apply, the figure of merit $G(A, T_1, \ldots, T_K)$ being representative of transmission robustness to interference and/or noise and/or path loss, and being determined under a constraint such that the frequency hopping sequences $A_1, \ldots, A_N$ are defined among a predefined set of allowable frequency hopping sequences which is a subset of all the time and frequency resources sequences made possible by said grid;

selecting the set of individual sequences $T_1, \ldots, T_K$ showing the best figure of merit $G(A, T_1, \ldots, T_K)$ according to a predefined criteria relative to the computed figures of merit $G(A, T_1, \ldots, T_K)$;

wherein the frequency hopping sequences $A_1, \ldots, A_N$ are statically defined.

12. A device for determining time and frequency resources from amongst time and frequency resources of a wireless communications network to be used for performing K individual transmissions over N successive frames in said wireless communications network, the time and frequency resources to be used for performing the K individual transmissions defining respective individual sequences $T_1, \ldots, T_K$ over the N successive frames, one time and frequency resource having to be allocated to one of the K individual transmissions per frame, wherein the time and frequency resources of the wireless communications network are represented by a grid with time resources on one dimension and frequency resources on another dimension, the grid defining possible time and frequency resources sequences such that one transmission among the K individual transmissions being allowed per time resource, the device comprising:

processing circuitry to compute a figure of merit $G(A, T_1, \ldots, T_K)$ for each possible set of the individual sequences $T_1, \ldots, T_K$ over the N successive frames on which respective frequency hopping sequences $[A_1, \ldots, A_N]=A$ apply, the figure of merit $G(A, T_1, \ldots, T_K)$ being representative of transmission robustness to interference and/or noise and/or path loss, and being determined under a constraint such that the frequency hopping sequences $A_1, \ldots, A_N$ are defined among a predefined set of allowable frequency hopping sequences which is a subset of all the time and frequency resources sequences made possible by said grid;

to select the set of individual sequences $T_1, \ldots, T_K$ showing the best figure of merit $G(A, T_1, \ldots, T_K)$ according to a predefined criteria relative to the computed figures of merit $G(A, T_1, \ldots, T_K)$;

dynamically defining the frequency hopping sequences $A_1, \ldots, A_N$ jointly with the set of individual sequences $T_1, \ldots, T_K$; and determining signalling information intended to be broadcasted in the wireless communications network to provide information representative of each frequency hopping sequence $A_1, \ldots, A_N$ to be applied to the respective N successive frames, said signalling information consisting of a code in a codebook representing an alphabet of said predefined set of allowable frequency hopping sequences, the alphabet having a size limited by a maximum size of the signalling information.

* * * * *